US011987737B2

(12) United States Patent
Marandi et al.

(10) Patent No.: US 11,987,737 B2
(45) Date of Patent: May 21, 2024

(54) PARTICLES WITH OPTICAL METAMATERIAL SHELLS

(71) Applicant: California Institute of Technology, Pasadena, CA (US)

(72) Inventors: Alireza Marandi, Pasadena, CA (US);
Joon Hwan Bang, Pasadena, CA (US);
Saman Jahani, Pasadena, CA (US);
Nicholas Kotov, Ann Arbor, MI (US);
Douglas G. Montjoy, Ann Arbor, MI (US)

(73) Assignees: California Institute of Technology, Pasadena, CA (US); The Regents of the University of Michigan, Ann Arbor, MI (US)

( * ) Notice: Subject to any disclaimer, the term of this patent is extended or adjusted under 35 U.S.C. 154(b) by 183 days.

(21) Appl. No.: 17/188,593

(22) Filed: Mar. 1, 2021

(65) Prior Publication Data

US 2021/0269708 A1     Sep. 2, 2021

Related U.S. Application Data

(60) Provisional application No. 62/983,347, filed on Feb. 28, 2020.

(51) Int. Cl.
| | |
|---|---|
| *C09K 11/02* | (2006.01) |
| *C09K 11/54* | (2006.01) |
| *G02F 1/37* | (2006.01) |
| *G02F 1/39* | (2006.01) |
| *H02S 10/30* | (2014.01) |

(52) U.S. Cl.
CPC .......... *C09K 11/025* (2013.01); *C09K 11/54* (2013.01); *G02F 1/37* (2013.01); *G02F 1/39* (2013.01); *H02S 10/30* (2014.12)

(58) Field of Classification Search
CPC ....... C09K 11/025; C09K 11/54; H02S 10/30; G02F 1/39
See application file for complete search history.

(56) References Cited

PUBLICATIONS

Muhlig et al., "Self-assembled plasmonic metamaterials", Nanophotonics 2013; 2(3): 211-240 (Year: 2013).*
Shchernakov, M.R., et al., "Enhanced Third-Harmonic Generation in Silicon Nanoparticles Driven by Magnetic Response", Nano Letters, 2014, pp. 6488-6492, vol. 14.
Sievenpiper, D.F., et al., "Experimental Validation of Performance Limits and Design Guidelines for Small Antennas", IEEE Transactions on Antennas and Propagation, Jan. 2012, pp. 8-19, vol. 60, No. 1.
Smirnova, D., et al., "Multipolar nonlinear nanophotonics", Optica, Nov. 2016, pp. 1241-1255, vol. 3, No. 11.
Vahala, K.J., "Optical microcavities", Nature, Aug. 2003, pp. 839-846, vol. 424.

(Continued)

*Primary Examiner* — Tae-Sik Kang
(74) *Attorney, Agent, or Firm* — Gates & Cooper LLP

(57) ABSTRACT

A metamaterial shell architected on a core particle (comprising organic or inorganic material) so as to form a novel class of structurally hierarchical particle that has degrees of freedom in design parameters stemming from effective optical response of the metamaterial shell and from the electromagnetic modes in the core to elicit optical behaviours that are not easily achievable and designable in particles having simpler or smoother geometries.

18 Claims, 28 Drawing Sheets

(56) References Cited

PUBLICATIONS

Wang, K., et al., "Quantum metasurface for multiphoton interference and state reconstruction", Science, 2018, pp. 1104-1108, vol. 361.

Wheeler, H.A., "Fundamental Limitations of Small Antennas", Proceedings of the IRE, 1947, pp. 1479-1484, vol. 35, No. 12.

Wu, L-A., et al., "Generation of Squeezed States by Parametric Down Conversion", Physical Review Letters, Nov. 1986, pp. 2520-2523, vol. 57, No. 20.

Xu, F., et al., "Fabrication, modeling, and characterization of form-birefringent nanostructures", Optics Letters, Dec. 1995, pp. 2457-2459, vol. 20, No. 24.

Yang, Y., et al., "Nonlinear Fano-Resonant Dielectric Metasurfaces", Nano Letters, 2015, pp. 7388-7393, vol. 15.

Yesilkoy, F., et al., "Ultrasensitive hyperspectral imaging and biodetection enabled by dielectric metasurfaces", Nature Photonics, Jun. 2019, pp. 390-396, vol. 13.

Zhang, Y., et al., "Three-Dimensional Nanostructures as Highly Efficient Generators of Second Harmonic Light" Nano Letters, 2011, pp. 5519-5523, vol. 11.

Ziolkowski, R.W., et al., "Application of Double Negative Materials to Increase the Power Radiated by Electrically Small Antennas", IEEE Transactions on Antennas and Propagation, Oct. 2003, pp. 2626-2640, vol. 51, No. 10.

Bahng, J.H., et al., "Mie Resonance Engineering in Meta-Shell Supraparticles for Nanoscale Nonlinear Optics", ACS Nano, 2020, pp. 17203-17212, vol. 14.

Bahng, J.H., et al., "Anomalous dispersions of 'hedgehog' particles", Nature, Jan. 2015, pp. 596-599, vol. 517.

Baranov, D.G., et al., "All-dielectric nanophotonics: the quest for better materials and fabrication techniques", Optica, Jul. 2017, pp. 814-825, vol. 4, No. 7.

Camacho-Morales, R., et al., "Nonlinear Generation of Vector Beams From AlGaAs Nanoantennas", Nano Letters, 2016, pp. 7191-7197, vol. 16, No. 11.

Catrysse, P.B., et al., "Transverse Electromagnetic Modes in ApertureWaveguides Containing a Metamaterial with Extreme Anisotropy", Physical Review Letters, Jun. 2011, pp. 223902-1-223902-4, vol. 106.

Chen, Z., et al., "Photonic nanojet enhancement of backscattering of light by nanoparticles: a potential novel visible-light ultramicroscopy technique", Optics Express, Apr. 2004, pp. 1214-1220, vol. 12, No. 7.

Chu, L.J., "Physical Limitations of Omnidirectional Antennas", Journal of Applied Physics, May 1948, pp. 1163-1175, vol. 19.

Collin, R., et al., "Evaluation of Antenna Q", IEEE Transactions on Antennas and Propagation, 1964, pp. 23-27, vol. 12, No. 1.

Eckardt, R.C., et al., "Optical parametric oscillator frequency tuning and control", J. Opt. Soc. Am. B, Mar. 1991, pp. 646-667, vol. 8, No. 1.

Ermolaev, G.A., et al., "Giant optical anisotropy in transition metal dichalcogenides for next-generation photonics", Nature Communications, 2021, vol. 12, No. 854, pp. 1-9.

Gigli, C., et al., "Quasinormal-mode modeling and design in nonlinear nano-optics", ACS Photonics, 2020, pp. 1-8.

Gili, V.F., et al., "Monolithic AlGaAs second-harmonic nanoantennas", Optics Express, Jul. 2016, pp. 15965-15971, vol. 24, No. 14.

Green, T.D., et al., "Optical material anisotropy in high-index transition metal dichalcogenide Mie nanoresonators", Optica, Jun. 2020, pp. 680-686, vol. 7, No. 6.

Jacob, Z., et al., "Optical Hyperlens: Far-field imaging beyond the diffraction limit", Optics Express, Sep. 2006, pp. 8247-8256, vol. 14, No. 18.

Jahani, S., et al., "Transparent subdiffraction optics: nanoscale light confinement without metal", Optica, Aug. 2014, pp. 96-100, vol. 1, No. 2.

Jahani, S., et al., "Breakthroughs in Photonics 2014: Relaxed Total Internal Reflection", IEEE Photonics Journal, Jun. 2015, pp. 1-5, vol. 7, No. 3.

Jahani, S., et al., "All-dielectric metamaterials", Nature Nanotechnology, Jan. 2016, pp. 23-36, vol. 11.

Jahani, S., et al., "Controlling evanescent waves using silicon photonic all-dielectric metamaterials for dense integration", Nature Communications, 2018, pp. 1-10, vol. 9.

Jahani, S., et al., "Wavelength-scale optical parametric oscillators", Optica, Feb. 2021, pp. 262-268, vol. 8, No. 2.

Koshelev, K., et al., "Subwavelength dielectric resonators for nonlinear nanophotonics", Science, Jan. 2020, pp. 288-292, vol. 367.

Krasnok, K., et al., "Nonlinear metasurfaces: a paradigm shift in nonlinear optics", Materials Today, Jan./Feb. 2018, pp. 8-21, vol. 21, No. 1.

Kuznetsov, A.I., "Optically resonant dielectric nanostructures", Science, Nov. 2016, pp. 1-9, vol. 354.

Liu, W., et al., "Q-factor enhancement in all-dielectric anisotropic nanoresonators", Physical Review B, 2016, pp. 195436-1-195436-8, vol. 94.

Liu, W., "Ultra-directional super-scattering of homogenous spherical particles with radial anisotropy", Optics Express, Jun. 2015, pp. 14734-14743, vol. vol. 23, No. 1.

Liu, W., et al., "Q-factor and absorption enhancement for plasmonic anisotropic nanoparticles", Optics Letters, 2016, pp. 3563-3566, vol. 41.

Liu, Y., et al., "Direct Observation of Nanoscale Light Confinement without Metal", Advanced Materials, 2019, pp. 1-6, vol. 31.

Li, H., et al., "Beyond Chu's Limit with Floquet Impedance Matching", Physical Review Letters, 2019, pp. 164102-1-164102-6, vol. 123.

Luk'Yanchuk, B.S., et al., "Refractive index less than two: photonic nanojets yesterday, today and tomorrow [Invited]", Optical Materials Express, Jun. 2017, pp. 1820-1846, vol. 7, No. 6.

Lumerical, FDTD Solutions, http://www.lumerical.com, as downloaded Jun. 4, 2021, pp. 1-3.

Marandi, A., et al., "Network of Time-Multiplexed Optical Parametric Oscillators as a Coherent Ising Machine", Nature Photonics, 2014, pp. 937-942, vol. 8, No. 12.

Marino, G., et al., "Spontaneous photon-pair generation from a dielectric nanoantenna", Optica, Nov. 2019, pp. 1416-1422, vol. 6, No. 11.

McMahon, P.L., et al., "A fully programmable 100-spin coherent Ising machine with all-to-all connections", Science, Nov. 2016, pp. 614-617, vol. 354, Issue 6312.

Morin, O., et al., "Remote creation of hybrid entanglement between particle-like and wave-like optical qubits", Nature Photonics, 2014, pp. 1-7, vol. 8, No. 7.

Muraviev, A.V., et al., "Massively parallel sensing of trace molecules and their isotopologues with broadband subharmonic mid-infrared frequency combs", Nature Photonics, Apr. 2018, pp. 209-214, vol. 12.

Nehra, R., et al., "State-independent quantum state tomography by photon-No. resolving measurements", Optica, Oct. 2019, pp. 1356-1360, vol. 6, No. 10.

Nielsen, M.P., et al., "Giant nonlinear response at a plasmonic nanofocus drives efficient four-wave mixing", Science, 2017, pp. 1179-1181, vol. 358.

Niu, S., et al., "Giant optical anisotropy in a quasi-onedimensional crystal", Nature Photonics, Jul. 2018, pp. 392-396, vol. 12.

Palmer, B.A., et al., "A highly reflective biogenic photonic material from core-shell birefringent nanoparticles", Nature Nanotechnology, 2020, pp. 138-144, vol. 15, No. 2.

Pertsch, T., et al., "Nonlinear optics with resonant metasurfaces", MRS Bulletin, Mar. 2020, pp. 210-220, vol. 45.

Pu, Y., et al., "Nonlinear Optical Properties of Core-Shell Nanocavities for Enhanced Second-Harmonic Generation", Physical Review Letters, May 2010, pp. 207402-1-207402-4, vol. 104.

Qiu, C-W., et al., "Spherical cloaking with homogeneous isotropic multilayered structures", Physical Review E, 2009, pp. 047602-1-047602-4, vol. 79.

Qiu, C-W., et al., "Peculiarities in light scattering by spherical particles with radial anisotropy", J. Opt. Soc. Am. A, Jul. 2008, pp. 1623-1628, vol. 25, No. 7.

(56) References Cited

PUBLICATIONS

Qiu, C-W., et al., "Field Representations in General Gyrotropic Media in Spherical Coordinates", IEEE Antennas and Wireless Propagation Letters, 2005, pp. 467-470, vol. 4.

Reshef, O., et al., "Nonlinear optical effects in epsilon-near-zero media", Nature Reviews | Materials, Aug. 2019, pp. 535-551, vol. 4.

Riley, C.T., et al., "High-Quality, Ultraconformal Aluminum-Doped Zinc Oxide Nanoplasmonic and Hyperbolic Metamaterials", Small, 2016, pp. 892-901, vol. 12, No. 7.

Roy, A., et al., "Spectral phase transitions in optical parametric oscillators", Nature Communications, 2021, pp. 1-10, vol. 12.

Rybin, M.V., "Phase diagram for the transition from photonic crystals to dielectric metamaterials", Nature Communications, 2015, pp. 1-6, vol. 6.

Saerens, G., et al., "Engineering of the Second-Harmonic Emission Directionality with III-V Semiconductor Rod Nanoantennas", Laser Photonics Rev., 2020, 2000028, pp. 1-10.

Schuller, J.A., et al., "General properties of dielectric optical antennas", Optics Express, Dec. 2009, pp. 24084-24095, vol. 17, No. 26.

Schuller, J.A., et al., "Dielectric Metamaterials Based on Electric and Magnetic Resonances of Silicon Carbide Particles", Physical Review Letters, Sep. 2007, pp. 107401-1-107401-4, vol. 99.

\* cited by examiner

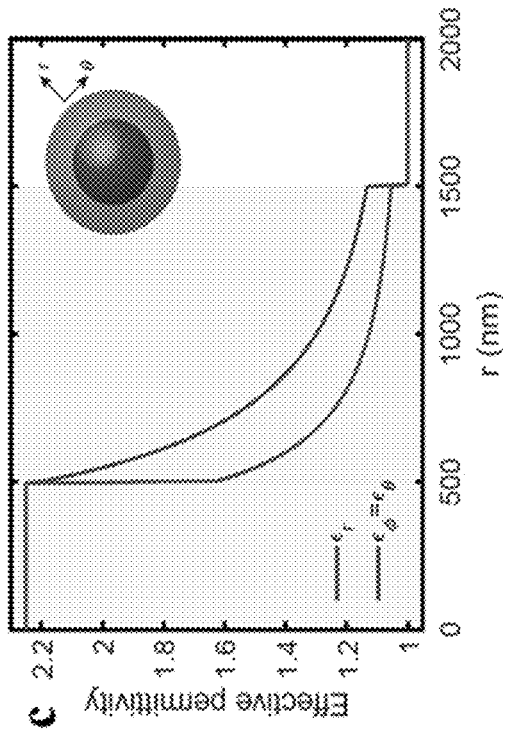
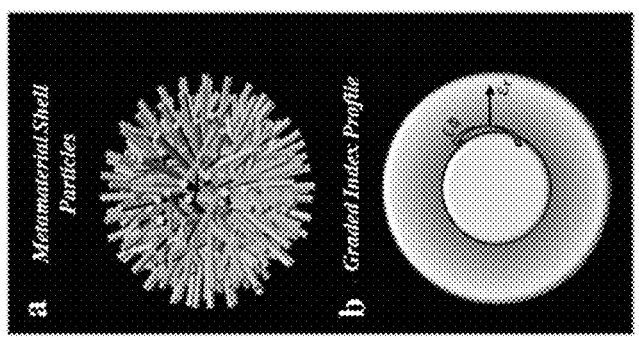
Figure 3A
Figure 3B
Figure 3C

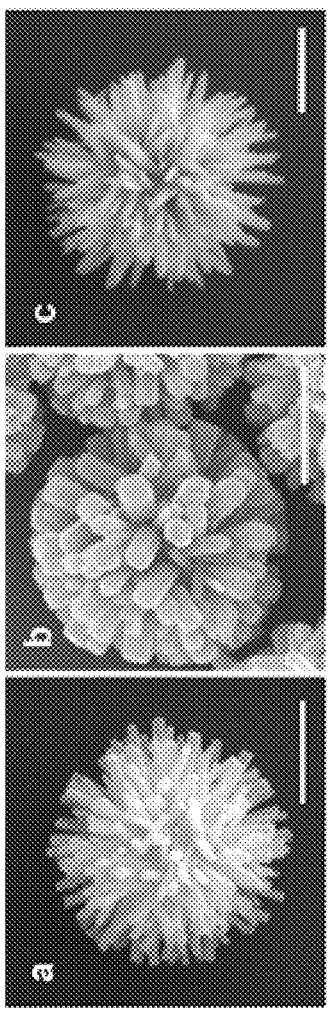
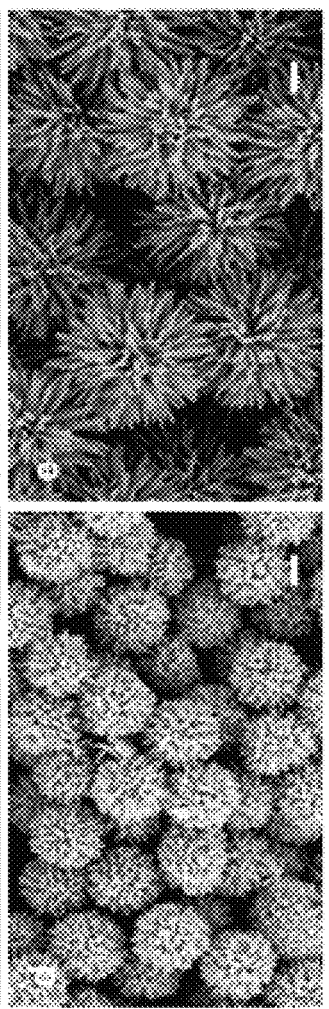
Figure 5A Figure 5B Figure 5C
Figure 5D Figure 5E

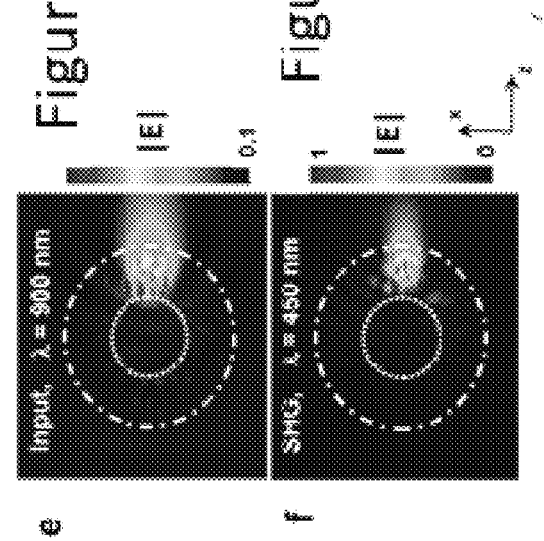
Figure 9E
Figure 9F
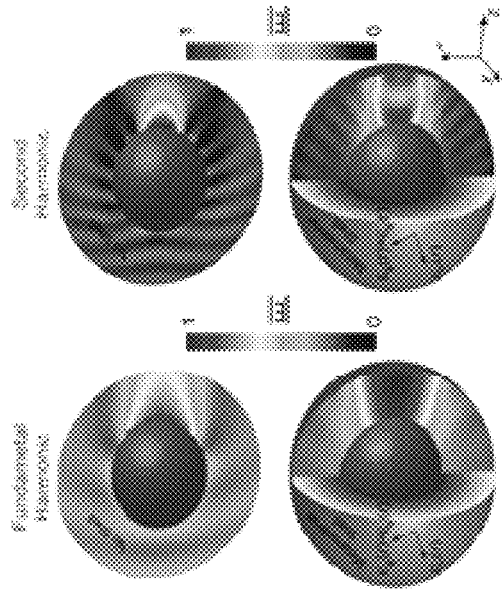
Figure 9D

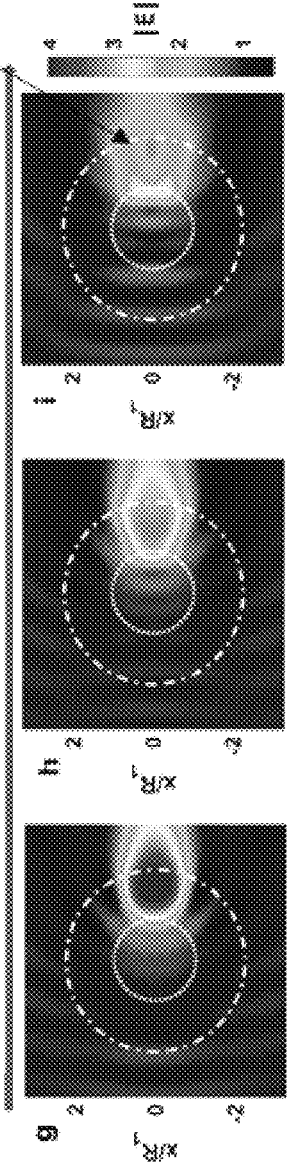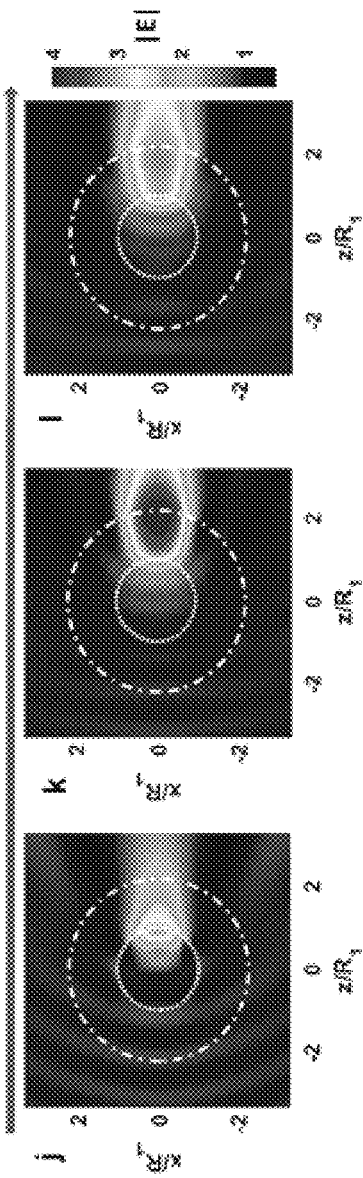
Figure 9G  Figure 9H  Figure 9I
Figure 9J  Figure 9K  Figure 9L

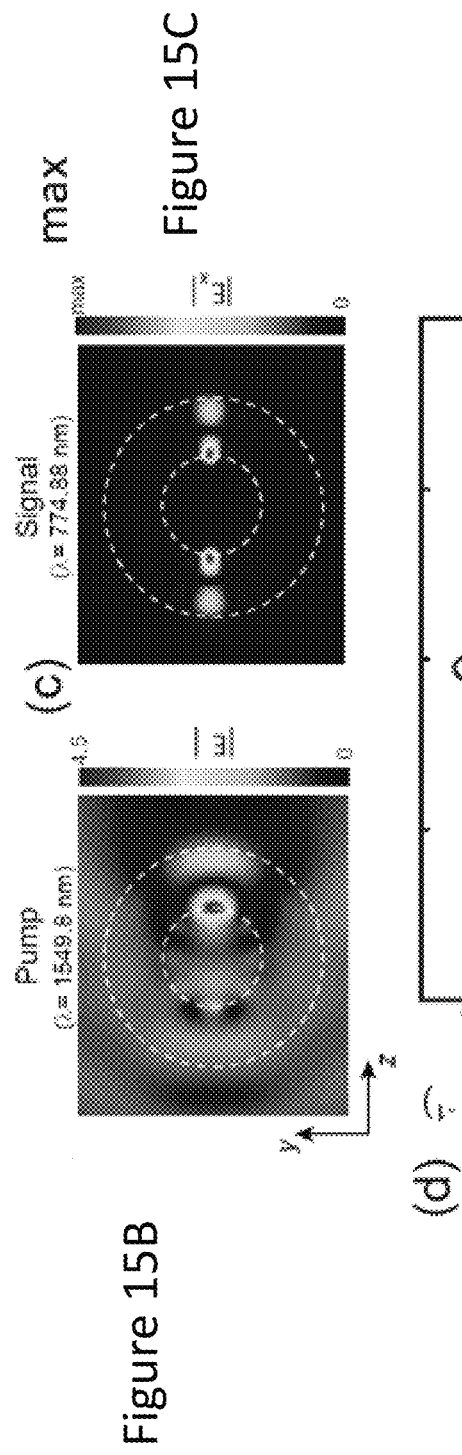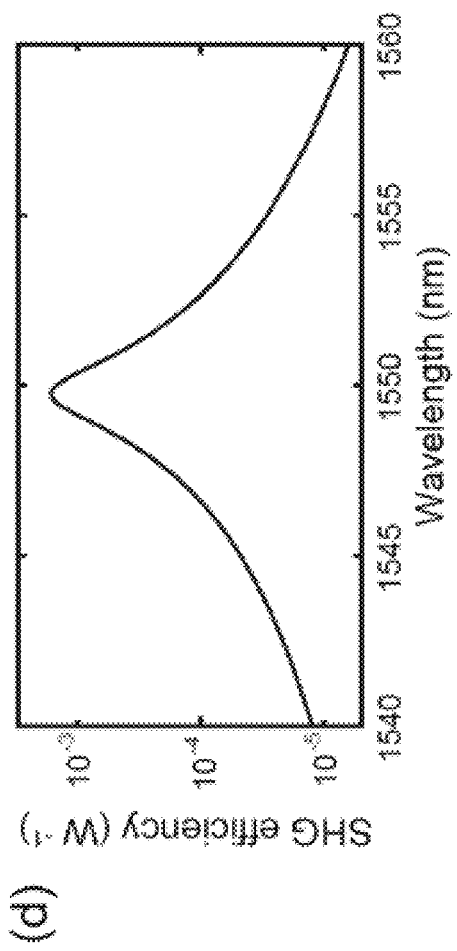
Figure 15B
Figure 15C
Figure 15D

PARTICLES WITH OPTICAL METAMATERIAL SHELLS

CROSS REFERENCE TO RELATED APPLICATIONS

This application claims the benefit under 35 USC 119(e) of commonly assigned U.S. Provisional Patent Application Ser. No. 62/983,347, filed Feb. 28, 2020, by Alireza Marandi, Joon Hwan Bang, Saman Jahani, Nicholas Kotov, and Douglas G. Montjoy, entitled "PARTICLES WITH OPTICAL METAMATERIAL SHELLS," (CIT-8254-P), which application is incorporated by reference herein.

BACKGROUND OF THE INVENTION

1. Field of the Invention

The present invention relates to methods and systems for achieving target optical properties with particles having structural hierarchy (metamaterial shell particles).

2. Description of the Related Art

Efficient nonlinear light generation requires long range nonlinear interaction and/or strong field enhancement [5]. For massive computing and sensing in mid-infrared, it is desirable to miniaturize nonlinear systems to nano-scale [38, 61, 66]. However, miniaturization of photonic devices to nano-scale not only reduces the interaction length, but also deteriorates the light confinement because of the diffraction limit of light. Plasmonic and epsilon-near-zero structures can enhance light confinement at nanoscale leading to strong nonlinear response with limitations due to the optical loss of metals [46, 67, 42, 50].

Recently, light confinement in all-dielectric high-index nano-structures has emerged as a low loss alternative to enhance the nonlinear response at nano-scale [59, 27, 45, 57, 65, 14, 6, 37, 26, 54]. The high-Q Mie resonances in high-index particles with sub-wavelength sizes can help to confine energy inside the particles which can be beneficial for nonlinear wavelength conversion [22, 28, 3]. However, in isotropic media, the momentum increases with increasing the refractive index. This constrains the field overlap especially for higher order high-Q modes. As a result, exploiting higher order modes without a proper momentum matching does not necessarily improve the nonlinear response [13, 24]. Besides, because of inefficient radiation of high-Q nano-antennas [62, 9, 10, 58, 68, 33], in/out-coupling in high-index dielectric nano-antennas is weak which degrades the nonlinear conversion efficiency in these particles.

Light can be confined using low-index particles based on the multi-mode interaction in which due to the low-Q and small momentum of light, multiple modes can spatially and spectrally overlap and form a bright hot-spot which is known as 'photonic nanojet' [34, 8]. However, the intensity of the hot-spot in simple configurations is directly proportional to the size of the particle, which hinders miniaturization. Besides, the hot-spot is usually formed outside the particle. Hence, it is difficult to construct an overlap between the optical mode and a nonlinear material. What is needed, then, are improved designs and methods for tailoring the effective optical response of metamaterials for useful applications. The present disclosure satisfies this need.

SUMMARY OF THE INVENTION

The present invention relates to achieving target optical properties with (e.g., colloidal) particles with structural hierarchy. The platform consists of a core spherical particle whose interface is architected with an array of structures (e.g., nanostructures) that form a metamaterial shell. The core sphere has an important set of design parameters to engineer its electromagnetic modes, which in turn determines its optical properties such as scattering. The circumambient metamaterial shell brings about various effective optical responses. As a consequence, the metamaterial shell particle with higher order structural hierarchy accommodates large degrees of freedom in the design parameters to elicit target optical responses that are not easy to achieve with particles of simple shapes and geometries.

Illustrative, non-exclusive examples of inventive subject matter according to the present disclosure are described in the following enumerated paragraphs.

1. A composition of matter useful for interacting with electromagnetic radiation, comprising:
   one or more particles, wherein each of the particles comprises a core and a metamaterial shell around the core, and wherein the metamaterial shell comprises structures having at least one dimension (e.g., largest dimension or outer diameter) smaller than a wavelength of the electromagnetic radiation interacting with the particles.

2. The composition of example 1, wherein the metamaterial shell comprises one or more conformal layers conformal with a surface of the core.

3. The composition of example 1 or 2, wherein the structures comprise particulates or conformed particles so that the metamaterial shell comprises an assembly of nanoparticles, each of the nanoparticles having the at least one dimension smaller than the wavelength of the electromagnetic radiation.

4. The composition of matter of any of the examples 1-3, wherein the structures (e.g., nanowires) have a length and a width, the length is along a direction extending from a surface of the core, and the length is longer than the width so that the interaction of the electromagnetic radiation with the structures is anisotropic across the shell.

5. The composition of matter of any of the examples 1-4, comprising separations between the structures, wherein the separations vary (e.g., increase or decrease) with increasing distance in a radial direction away from the core so that the interaction of the electromagnetic radiation (field and/or wave) varies or is different as a function of the distance from the core (e.g., the metamaterial shell has a graded refractive index as a function of the distance).

6. The composition of matter of any of the examples 1-6, wherein the metamaterial shell comprises at least one material selected from a metal, a plasmonic material (e.g., a material having plasmonic behaviour, or material supporting plasmons), a dielectric, semiconductor, doped material, a polymer, or a two dimensional material (e.g., graphene).

7. The composition of matter of any of the examples 1-6, wherein the structures are chemically synthesized from a surface of the core using a bottom up approach.

8. The composition of matter of any of the examples 1-7, wherein:
   the structures are dimensioned to have the interaction comprising a near field interaction with the electromagnetic radiation, and
   each of the particles are dimensioned so that the electromagnetic radiation is coupled to the metamaterial shell from a far field of the electromagnetic radiation.

9. The composition of matter of any of the examples 1-8, wherein the structures are dimensioned to have a near field interaction with the electromagnetic radiation after the electromagnetic radiation is coupled to the metamaterial shell through near field interaction with another device or optical structure (e.g., waveguide, optical fibre, fibre coupler, probe, antenna, another particle, resonator).

10. A device (e.g., a resonator) comprising the composition of matter of any of the examples 1-9, wherein the structures are tailored to achieve predetermined electromagnetic resonance frequencies of the electromagnetic radiation interacting with the particles (e.g., resonance frequencies selected or tailored for a particular application).

11. An anti-reflection coating comprising the composition of matter of any of the examples 1-10, wherein the structures tailor the electromagnetic resonance frequencies and an electromagnetic field profile of the electromagnetic radiation so as to suppress reflection of the electromagnetic radiation from the anti-reflection coating in one or more directions.

12. A wavelength converter comprising any of the examples 1-10, wherein the structures comprise a material having a nonlinear susceptibility generating an output electromagnetic field in response to the electromagnetic radiation inputted into the material, wherein the output electromagnetic field has one or more output wavelengths longer or shorter than one or more input wavelengths of the electromagnetic radiation.

13. The wavelength converter of example 12, wherein the wavelength converter comprises an optical parametric oscillator and the output electromagnetic field has one or more output wavelengths longer than the pump wavelengths.

14. The wavelength converter of example 12 or 13, wherein the structures and resonances tailor at least one of a spatial distribution of the field of the electromagnetic radiation and a conversion efficiency of the electromagnetic radiation into the output electromagnetic field.

15. The wavelength converter of example 14, wherein the structures and resonances increase the conversion efficiency.

16. The composition of matter of any of the examples 1-15, wherein the structures and resonances tailor a direction of non-linear scattering of the electromagnetic radiation by the metamaterial shell comprising the material having a nonlinear susceptibility (e.g., ($\chi^{(2)}$, $\chi^{(3)}$).

17. The composition of matter of any of the examples 1-16, wherein the structures tailor the resonances so that the particles have a hyperbolic response to the electromagnetic radiation.

18. A source of entangled photons comprising the wavelength converter of any of the examples 12-17, wherein the output electromagnetic field comprises two entangled photons.

19. A modulator or switch comprising the resonator of example 10, wherein the structures tailor the electromagnetic resonance frequencies and an electromagnetic field profile of the electromagnetic radiation so as to modulate or switch on and off at least one of a scattering, a transmission, an amplitude, or frequency of the electromagnetic radiation according to a communication signal.

20. A device (e.g., a thermophotovoltaic device generating power from thermal energy) comprising the resonator of claim 10, wherein the structures tailor the electromagnetic resonance frequencies and an electromagnetic field profile of the electromagnetic radiation so as to control blackbody emission from the thermophotovoltaic device (e.g., so that emission is Super Planckian).

21. The composition of matter or method of any of the examples 1-20, wherein the structures comprise etched features in the metamaterial shell.

22. The composition of matter or method of any of the examples 1-20, comprising a colloid including the particles.

23. The composition of matter of any of the examples wherein the electromagnetic radiation has any wavelength (e.g., in a range of 300 nm to 10 microns) and the at least one dimension of the structures is in a range of 1-1000 nm (nanometers).

24. A method of making a composition of matter useful for interacting with electromagnetic radiation, comprising:
forming a metamaterial shell on a core, wherein the metamaterial shell comprises structures having at least one dimension smaller than a wavelength of the electromagnetic radiation interacting with the particles, wherein the forming comprises bottom up fabrication including deposition in three dimensions from a surface of the core.

25. The method of example 24, wherein the forming comprises at least one of chemical synthesis on the core or etching a material deposited on the core.

26. The composition of matter (e.g., of any of the examples 1-22) manufactured using the method of example 24 or 25.

BRIEF DESCRIPTION OF THE DRAWINGS

Referring now to the drawings in which like reference numbers represent corresponding parts throughout:

FIGS. 2A-2D. Example synthesis method and particle designs, wherein FIG. 2A shows a plurality of particles or structures are deposited or seeded onto the surface to form the metamaterial shell on the surface of the core, FIG. 2B illustrates an example wherein the structures have large aspect ratio extending from surface of the core, FIG. 2C illustrates an example wherein the metamaterial shell comprises one or more conformal layers conformal with a surface of the core, and FIG. 2D illustrates an example wherein the structures comprise particulates 204 or conformed particles.

FIGS. 3A-3C. Example effective optical responses in the metamaterial shell particle: FIG. 3A, model constructed with computer aided design used for simulations, FIG. 3B, radial graded refractive index profile, FIG. 3C radial anisotropy profile, in which the permittivity in the radial direction does not coincide with that in the angular direction.

FIGS. 5A-5K. Structural engineering of MSP. FIGS. 5A-5C, scanning electron microscopy (SEM) images of the MSP synthesized with a polystyrene (PS) μ-sphere core (diameter, d=1 μm) having diverse geometries and dimensions of its unit building block ZnO NRs that constitute the meta-shell; FIGS. 5D,5E, MSP synthesized with a $SiO_2$ μ-sphere template (d=1 μm) and having ZnO NR (FIG. 5D) length l≈600 nm, designated MSP2.2 and (FIG. 5E) l≈1290 nm, designated MSP3.58; FIGS. 5F-5I, spectral tuning is achieved by adjusting the corrugation geometry in the meta-shell, (FIG. 5F) peak normalized (P.N.) extinction spectra (A.U.), in aqueous dispersion, of ZnO NRs, d=1 μm PS μ-sphere and MSP; P.N. extinction spectra of MSP with (FIG. 5G) varying spike lengths, l≈190 nm, l≈270 nm, l≈400 nm, l≈600 nm and (FIG. 5H) varying spike widths, w≈100 nm, w≈120 nm, w≈135 nm, and (FIG. 5I) varying core diameters, d=1 µm, d=3 µm; j-k, Overlap in the spectral line shape between the extinction cross-section($\sigma_{ext}$) of a model MSP from the FDTD full wave simulation, and the extinction spectra from the experimental measurement, for both suspended in (FIG. 5J) water and in (FIG. 5K) air. Since absorption for ZnO is minuscule above λ=360 nm (as is the case for both polystyrene and silica), the spectrum shown here is essentially the scattering spectrum arising from different resonances.

FIG. 7A shows a schematic representation of a low-index ($\sqrt{\epsilon}$<2) particle with metamaterial shell. The radial anisotropy of the shell, with an optical axis in the r direction, offers an extra degree of freedom to engineer the electric Mie modes of the particle. $\epsilon_\theta$ and $\epsilon_\varphi$ control the momentum while $\epsilon_r$ can control the order of spherical waves.

FIG. 7B shows the electric field distribution of the $5^{th}$ electric mode at resonance as a function of $\epsilon_r$ in the shell while $\epsilon_1 = \epsilon_\theta = \epsilon_\varphi = 1$. The core is isotropic $\epsilon=2.2$ with a radius of $R_1=0.5$ µm, and the shell radius is $R_2=1.1$ µm. The shell has a graded-index profile such that $\epsilon_r(R_2)=1$. Increasing the anisotropy enhances the field at the core/shell interface. Similar effect can be seen for other electric modes as well. FIG. 7C shows the anisotropy of the shell can enhance the fields at second harmonic at the core/shell interface as well. The field enhancement and strong overlap can significantly enhance the nonlinear interaction for efficient second-harmonic generation and optical parametric oscillation processes.

FIG. 8A Linear response of the modes at the fundamental and second-harmonic frequencies for a low-index particle with anisotropic metamaterial shell. The parameters for the particle are the same as those in FIG. 5B with $\epsilon_r(R_1)=12$. The normalized scattering amplitude of the $5^{th}$ (red) and $13^{th}$ electric modes of the particle. The Q factor for the modes are 25 and 1.6e4, respectively. The second harmonic of the $5^{th}$ mode coincides with the $13^{th}$ mode. The contributions of other modes on SHG are negligible because of weak scattering response at the operating wavelengths. FIG. 8B shows the electric field distribution at the pump wavelength (λ=1549.8 nm) when the particle is excited by an x-polarized plane-wave propagating in the z direction. The electric field amplitude is normalized to the amplitude of the plane-wave. FIG. 8C shows the electric field distribution of the $13^{th}$ electric mode which resonates at the second-harmonic of the pump excitation. Due to the anisotropy of the shell, the field is enhanced at the interface between the core and the shell.

FIGS. 9A-9F. Mie resonance engineering with meta-shell. The diameter of the core sphere is $d_{core}$=1 µm, thickness of the meta-shell is $t_{shell}$=600 nm. The permittivity of the sphere is $\epsilon_{core}$=2.2; FIGS. 9A-9C, increase in the index gradient increases the broadband spectral overlap between the electric dipole (ED) and the magnetic dipole (MD) mode that spans several higher order harmonics, FIG. 9A, $\epsilon_r$, shell: 2.2, FIG. 9B, $\epsilon_r$, shell: 2.2→1.5, FIG. 9C, $\epsilon_r$, shell: 2.2→1; $a_1$ and $b_1$ are the scattering coefficients of electric and magnetic dipole in the first order, respectively. FIG. 9D Multimode interferences leading to the formation of photonic nanojet hotspot and their spatial overlap at both fundamental and the second harmonic wavelengths; e-f, FDTD full wave simulation, at λ=900 nm, showing (FIG. 9E) photonic nanojet formed by the model MSP2.2 upon light incidence and (FIG. 9F) enhanced forward scattering in the SHG radiation pattern by the model MSP, alike to a photonic nanojet. The details of the nonlinear optics simulations with the FDTD can be found in the 5-7; g-i, Increase in the angular anisotropy shifts the hotspot toward the core sphere interface, (FIG. 9G) co, shell: 2.2, (FIG. 9H) co, shell: 1.5, (FIG. 9I) co, shell: 1; Here, the radial anisotropy is kept constant, $\epsilon_{r, shell}$=2.2; FIGS. 9J-FIG. 9L, photonic nanojet features, calculated from the analytical modeling, for (FIG. 9J) the core sphere, (FIG. 9K) core sphere with meta-shell having gradient index (GI) feature and (FIG. 9L) core sphere with meta-shell having both the gradient index and anisotropy (A) features.

FIG. 13A Isotropic media. FIG. 13B Anisotropic media with $\varepsilon_r=1$. FIG. 13C Anisotropic media with $\varepsilon_\perp=\varepsilon_\theta=\varepsilon_\varphi=1$. $\varepsilon_\perp$ controls the momentum of spherical waves while $\varepsilon_\perp/\varepsilon_r$ changes the order of spherical Bessel waves. By increasing $\varepsilon_r$ while $\varepsilon_\perp$ is fixed, we can reduce the order without increasing the momentum. This results in an enhanced field intensity, especially in the sub-wavelength regime ($k_0 r \ll 1$).

FIGS. 15A-15D: Second-harmonic generation in particles with anisotropic metamaterial shell. FIG. 15A—Linear response of the modes at the fundamental and second-harmonic frequencies for a low-index particle with anisotropic metamaterial shell. The parameters for the particle are the same as those in FIG. 5B with $\varepsilon_r(R_1)=12$. The normalized scattering amplitude of the $5^{th}$ (red) and $13^{th}$ electric modes of the particle. The Q factor for the modes are 25 and 1.6e4, respectively. The second harmonic of the $5^{th}$ mode coincides with the $13^{th}$ mode. The contributions of other modes on SHG are negligible because of weak scattering response at the operating wavelengths. FIG. 15B: The electric field distribution at the pump wavelength ($\lambda=1549.8$ nm) when the particle is excited by an x-polarized plane-wave propagating in the z direction. The electric field amplitude is normalized to the amplitude of the plane-wave. FIG. 15C: The electric field distribution of the $13^{th}$ electric mode which resonates at the second-harmonic of the pump excitation. Due to the anisotropy of the shell, the field is enhanced at the interface between the core and the shell. FIG. 15D Second-harmonic generation efficiency as a function of the pump wavelength. All the contributing modes at the pump and the signal wavelengths are taken into account. The efficiency boosts as the second-harmonic wavelength approaches the resonance of the $13^{th}$ electric mode.

FIG. 16A shows oscillation threshold and FIG. 16B shows signal and idler separation as a function of the pump wavelength. All the contributing modes at the pump and the signal wavelengths are taken into account. The oscillation threshold drops remarkably as the pump wavelength approaches the resonance of the $13^{th}$ electric mode. Because of the detuning of the resonant frequency of signal/idler modes from the fundamental harmonic and nonlinear interactions between multiple modes a phase-transition from degenerate to non-degenerate case can happen.

FIG. 18A: Isotropic media. FIG. 18B shows anisotropic media with $\varepsilon_\perp=\varepsilon_\theta=\varepsilon_\varphi=1$. $\varepsilon_\perp$ controls the momentum of spherical waves while $\varepsilon_\perp/\varepsilon_r$ changes the order of spherical Bessel waves. By increasing $\varepsilon_r$ while $\varepsilon_\perp$ is fixed, we can reduce the order without increasing the momentum. This results in an enhanced field intensity, especially in the sub-wavelength regime ($k_0 r \ll 1$).

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

This invention is about metamaterials in shell (e.g., spherical) arrangements. It is a versatile platform to design optical responses which can be achieved without the need for precision top-down nanofabrication procedure.

1. Example Platform

Figure 1:
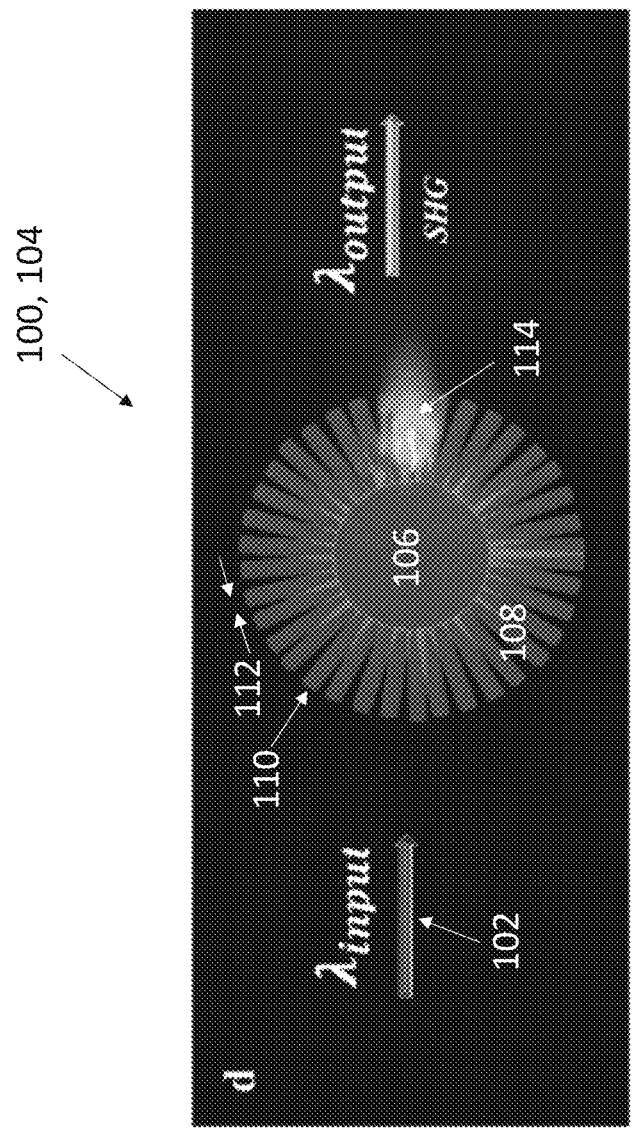
FIG. 1. Example particle comprising a core and metamaterial shell.

FIG. 1 illustrates an examples of a composition of matter 100 capable of interacting with electromagnetic radiation 102. The composition of matter comprises one or more particles 104, wherein each of the particles comprises a core 106 and a metamaterial shell 108 architected on the surface of the core. The metamaterial shell 108 comprises features or structures 110 having at least one dimension 112 smaller than a wavelength k of the electromagnetic radiation 100 interacting 114 with the particles 104.

Figure 2A:
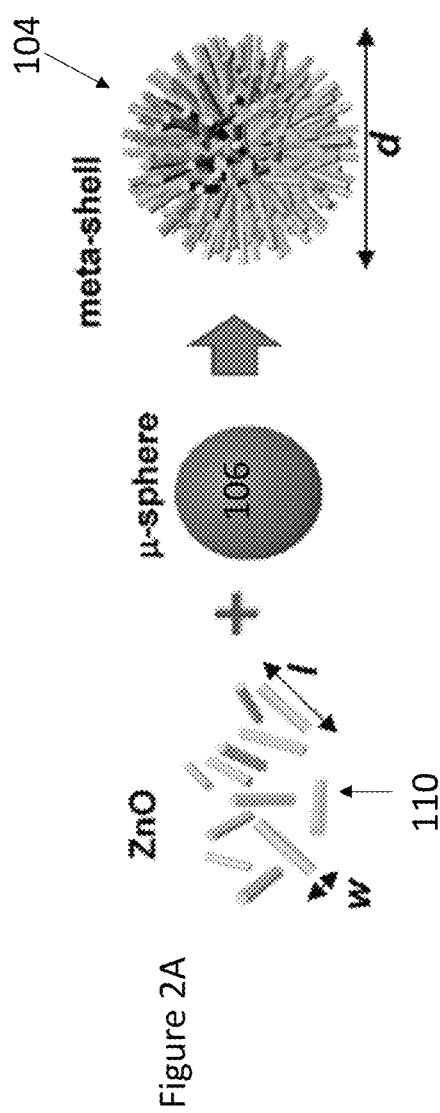
Figure 2B:
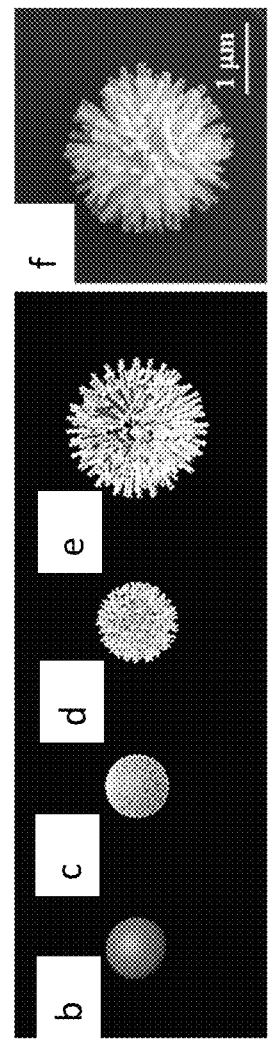

FIGS. 2A-2B illustrate an example synthesis method wherein the metamaterial shell is chemically synthesized or deposited onto the surface of the core, e.g., so that the metamaterial grows radially away from the surface of the core 106. In the example of FIG. 2A, a plurality of particles or structures 110 are deposited or seeded onto the surface to form the metamaterial shell on the surface of the core. The particles may be charged (e.g., positively charged) and the core may be oppositely charged (e.g., negatively charged) so that the particles are electrostatically adsorbed onto the surface of the core. Once adsorbed, the particles may be further grown using an aqueous chemical synthesis (e.g., a hydrothermal process).

The core comprises a (e.g., spherical) particle comprising a wide range of material types and sizes. The metamaterial shell may comprise building blocks comprising nanostructures engineered with dimensions (length, size, thickness), composition/constitutive properties, geometry, fill factors, and optical nonlinear properties tailored to the target effective optical properties and responses of the metamaterial. Arranging the nanoscale building blocks in a spherical, shell, or three dimensional configuration is a key distinguishing feature of embodiments of the present invention (as compared to conventional metamaterials).

Figure 2D:
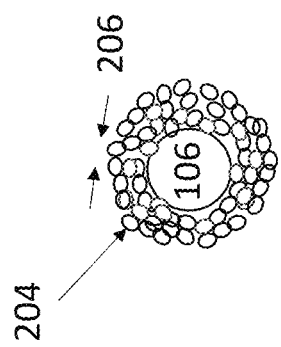
Figure 2C:
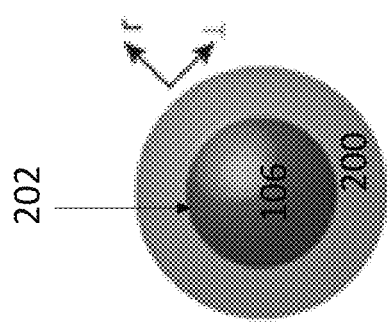

FIG. 2B illustrates an example wherein the structures 110 have large aspect ratio (e.g., length at least 3 times the width) extending from surface of the core, FIG. 2C illustrates an example wherein the metamaterial shell comprises one or more conformal layers 200 conformal with a surface 202 of the core, and FIG. 2D illustrates an example wherein the structures comprise particulates 204 or conformed particles so that the metamaterial shell comprises an assembly of particles each having at least one dimension 206 (e.g., largest diameter) smaller than the wavelength of the electromagnetic radiation.

FIG. 3 illustrates a metamaterial shell comprising a radially graded refractive index profile achieved using an orthospherical arrangement of (e.g., nanostructure) building blocks. In the example shown, the nanostructures comprise rods arranged in a shell around the spherical surface of the core and with their longitudinal axis oriented in a radial direction substantially perpendicular to the surface of the core (ortho-spherical arrangement). The radial graded refractive index profile stems from decreasing fill factors (changing density of spacing between structures) with increasing distance from the centre of the core. FIG. 3 further illustrates the arrangement of the nanostructure building blocks further forms the metamaterial shell having a radial anisotropic refractive index profile. Such radial anisotropy in the spherical coordinate is inaccessible with natural materials. Moreover, metamaterial shells as described herein can also achieve radial anisotropy even with isotropic building blocks in a spherical metamaterial shell.

Figures 4A, 4B:
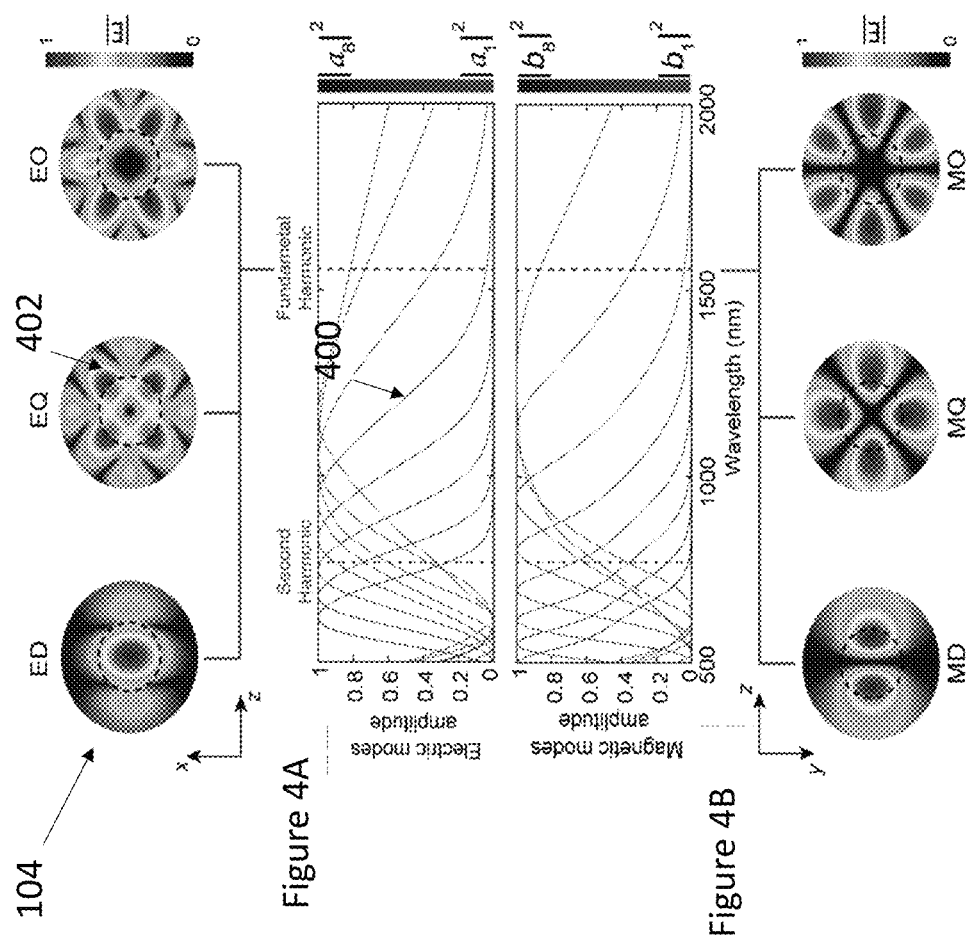
FIGS. 4A-4B. Mie resonance enrichment with meta-shell. Scattering coefficients of (FIG. 4A) electric and (FIG. 4B) magnetic multipoles in the MSP calculated from analytical modeling and Mie theory; compared to a core μ-sphere, the density of Mie resonances is enriched in the presence of a circumambient meta-shell. Here, $a_n$ and $b_n$ are the scattering coefficients of electric and magnetic dipole in the nth order, respectively.

Example Electromagnetic Features, Functionalities, and Responses in the Metamaterial Shell FIG. 4 illustrates how the core and structures in the metamaterial shell of FIG. 5f-5k are engineered (e.g., dimensions and density and material composition) to tailor electromagnetic resonance frequencies 400, polarizability, and the electromagnetic field profile 402 of the electromagnetic radiation interacting with each of the particles 104. In some examples, the particles each comprise a resonator and the features or structures tailor resonance properties of resonator.

In various examples, the features and/or resonances in the metamaterial shell are tailored so that the interaction with the electromagnetic radiation with the features controls at least one of a reflection (e.g., anti-reflection, elimination of reflection), transmission, absorption, scattering (linear and non-linear), wavelength conversion, electromagnetic-matter interaction, or all optical switching of the electromagnetic radiation. Example interactions are discussed in the following sections.

(a) Linear Scattering

Figures 5F, 5G, 5H, 5I, 5J, 5K:
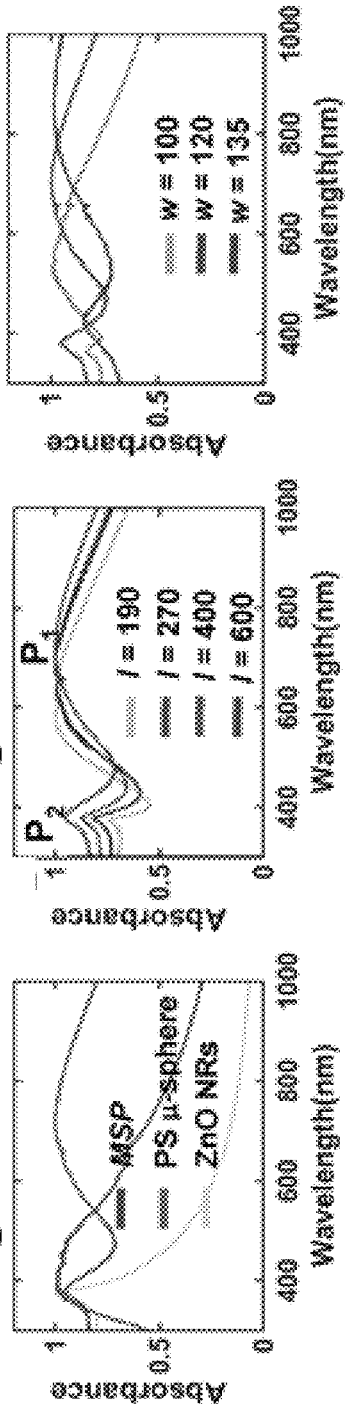

FIGS. 5F-5K illustrate linear light scattering measurements of the particles in FIG. 5a-5e (metamaterial comprising ZnO nanorods on a polystyrene core) in aqueous dispersion and shows that their extinction lineshapes do not correlate with either the ZnO NRs or the core μ-spheres, FIG. 5F. The spectra feature a broadband peak (P1) in the visible wavelengths and a narrower peak (P2) in the ultraviolet range. When P2 is approximately at the second harmonic of the P1, the overlap of the EM modes at both the fundamental and the second-harmonic wavelengths suggests opportunities for wavelength conversion. This emergent spectral behavior arising from multitude of Mie resonances can be fine-tuned by adjusting the meta-shell corrugation geometry or its core dimensions, FIG. 2g-i. These experimental findings on the linear response of the MSPs are verified with finite difference time domain (FDTD) full-wave simulations [1]. Numerical results of extinction cross-section Gext of MSP2.2 are in agreement with the experimental measurements, as depicted in FIG. 2j,k. Note that, due to solution based chemical synthesis nature of the MSP, there will be particle to particle variations which accounts for the slight mismatch in the scattering peaks between the experiment and the simulation.

(b) Controlling Electromagnetic Modes in the Metamaterial Shell and their Spectral Location by Controlling Polarizability of the Core Sphere.

Figure 6A:
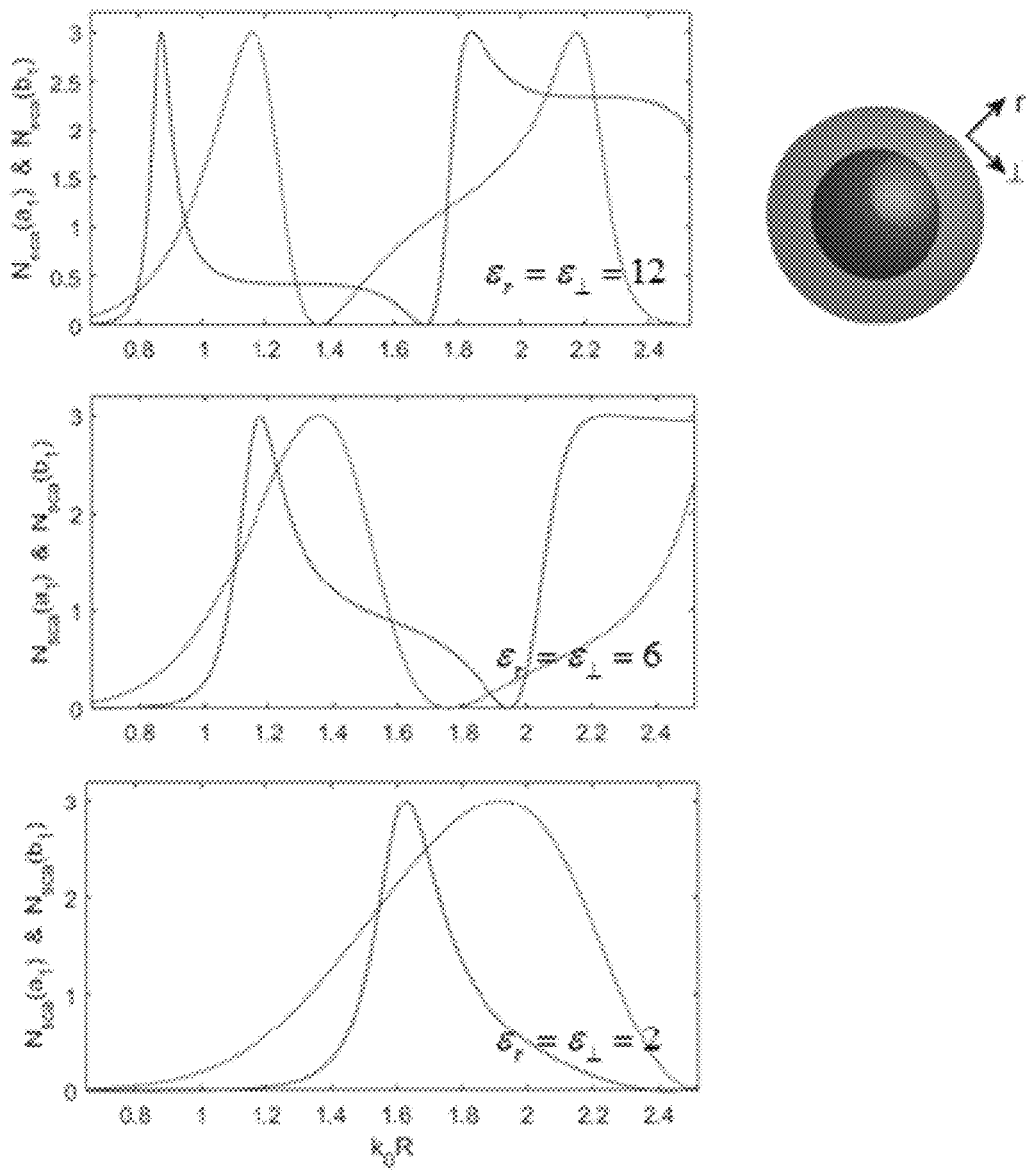
FIGS. 6A-6B. The scattering coefficient for the first electric (red) and magnetic (blue) modes of a dielectric particle with metamaterial shell. It is seen that for an isotropic shell (FIG. 6A), it is not easy to make an overlap between the electric and magnetic modes. However, by changing the anisotropy of the shell (FIG. 6B), we can make a strong overlap between the electric and magnetic modes.
Figure 6B:
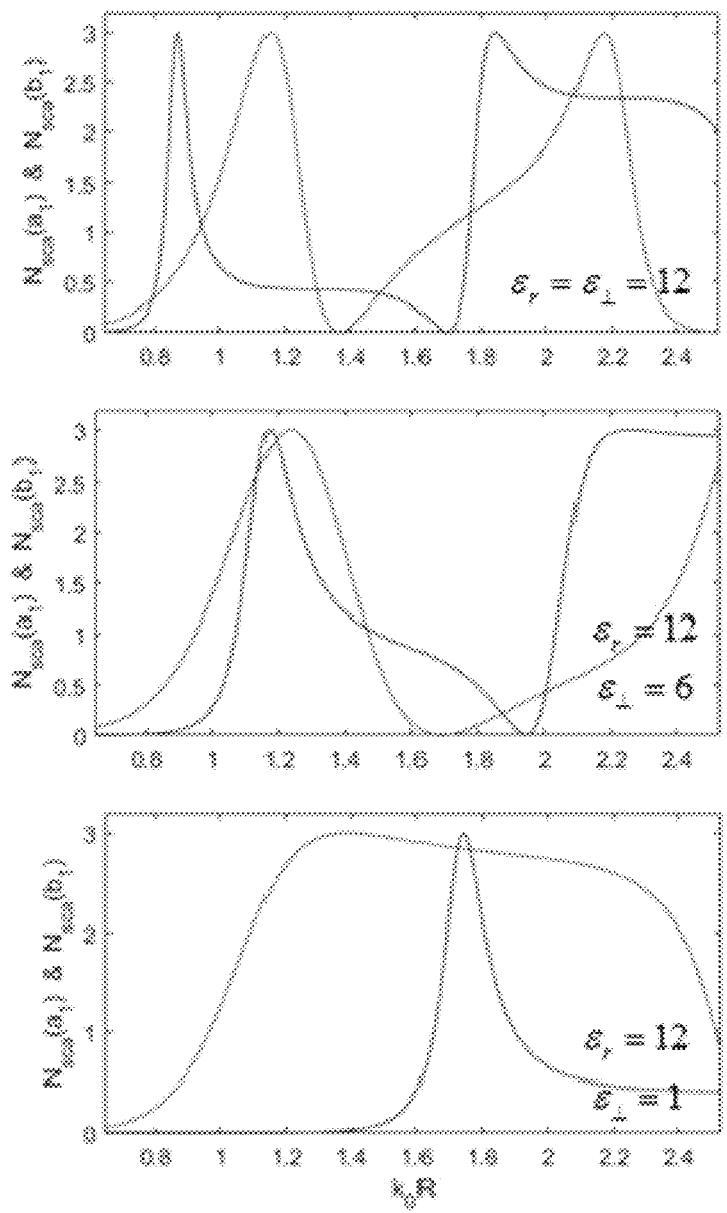

FIGS. 6A-6B illustrate the spectral location of the electromagnetic modes (the electric modes in particular) can be controlled by the constitutive properties of the core sphere. In the presence of the core sphere, the oscillations of the electric dipole modes at the opposite ends of the metamaterial shell extend and hybridize to form an extended oscillation. This is due to increased polarizability in the core region. The extension in the oscillation leads to the redshift in the spectral location of the electric dipole in the metamaterial shell particle.

FIG. 6A-6B further illustrate how appropriate resonance tuning of the metamaterial shell and the polarizability of the core can be used to control spectral and spatial overlap between the electric dipole mode and the magnetic dipole of the particle. Specifically, the spectral location of the electric dipole mode, through a spectral redshift, can be tailored to coincide with the spectral location of the magnetic dipole mode. The redshift in the spectral location of the electric dipole mode (determined by its oscillation length) is achieved by tuning the polarizability of the material that constitutes the core and at least one of a depth (thickness) or anisotropy of the metamaterial shell. Moreover, resonance tuning by changing the anisotropy of the shell can tune the field profile and location of the electric modes without changing the field profile and spectral location of the magnetic modes, thereby increasing control of the overlap between the electric and magnetic modes.

(c) Resonance Engineering Tailoring Nonlinear Responses and Properties

FIG. 7 illustrates how resonance tuning can also increase conversion efficiency of the nonlinear generation of electromagnetic radiation. In some examples, the enhancement in the nonlinear generation of light stems from the conjointment of linear responses that occur in the metamaterial shell and in the core sphere. Moreover, since efficiency of the nonlinear conversion is proportional to the intensity of the incident light, enhancement in the nonlinear conversion can be achieved by resonance tuning that enhances field strength within optical nonlinear crystal. In some examples, the nanoparticles/structures in the metamaterial shell are engineered to support various forms of near field Mie resonances that enable some degree of light confinement within the particles. The excitation of these resonant modes strengthens the nearfield intensity within the nanostructures and at its interfaces so as to enhance the conversion efficiency. As described above, such features as the sizes, geometries and the index of refraction of the structures (e.g., nanostructures) determine the resonances and their spectral locations.

Conventional enhancement in the conversion efficiency has been achieved with nanostructures that are constructed by precision nanofabrication and that are bound to a planar substrate. These nanostructures require high index materials complemented with specific geometries and dimensions that support high quality factor resonant modes, rendering it an incompatible process with low index materials. On the other hand, resonance tuning according to examples described herein enables enhancement in the nonlinear conversion efficiency irrespective of the refractive index, geometry, and dimensions of the nonlinear nanostructures.

FIG. 8 illustrates how the particles with metamaterial shell illustrated in FIG. 5a-5F are structured so that resonances of the interaction with the particles enhance second harmonic generation of light.

In other examples, the resonances of the particles are tuned to for parametric interactions wherein a pump wave incident on the particle is converted into a signal wave and an idler wave by interaction with the nonlinear material of the metamaterial shell. In some examples, the signal and idler comprise entangled photons.

(d) Tailoring Spatial Electromagnetic Field Distribution.

Figures 9A, 9B, 9C:
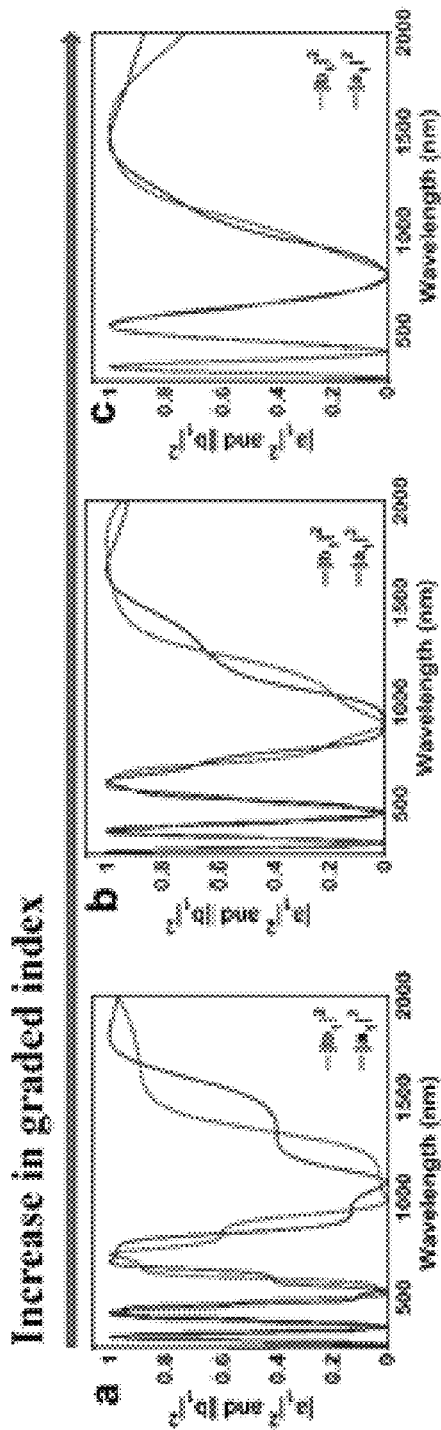

FIG. 9 illustrates an example wherein resonances of the particles in FIGS. 5a-5f cause interference of the electromagnetic fields that tailor spatial distribution 900 of the electromagnetic field. In the example of FIG. 9, the spatially tailored electromagnetic field comprises a hot spot, nanojet 902, or longitudinal field distribution having a width in a range of 1-1000 nanometers formed in response to irradiation with the electromagnetic radiation. The photonic nanojet is focused and is characterized by a high intensity nearfield that begins to appear at the onset of the spectral overlap between the electric and magnetic modes, at the shadow side of the particle. The contiguous metamaterial shell featuring radial graded refractive index and radial anisotropy profile modifies the linear response from the core particle by increasing the field intensity in the photonic nanojet, spatially localizing the nanojet volume exterior to the core and maximizing the spatial overlap with the metamaterial shell.

Figures 10A, 10B, 10C:
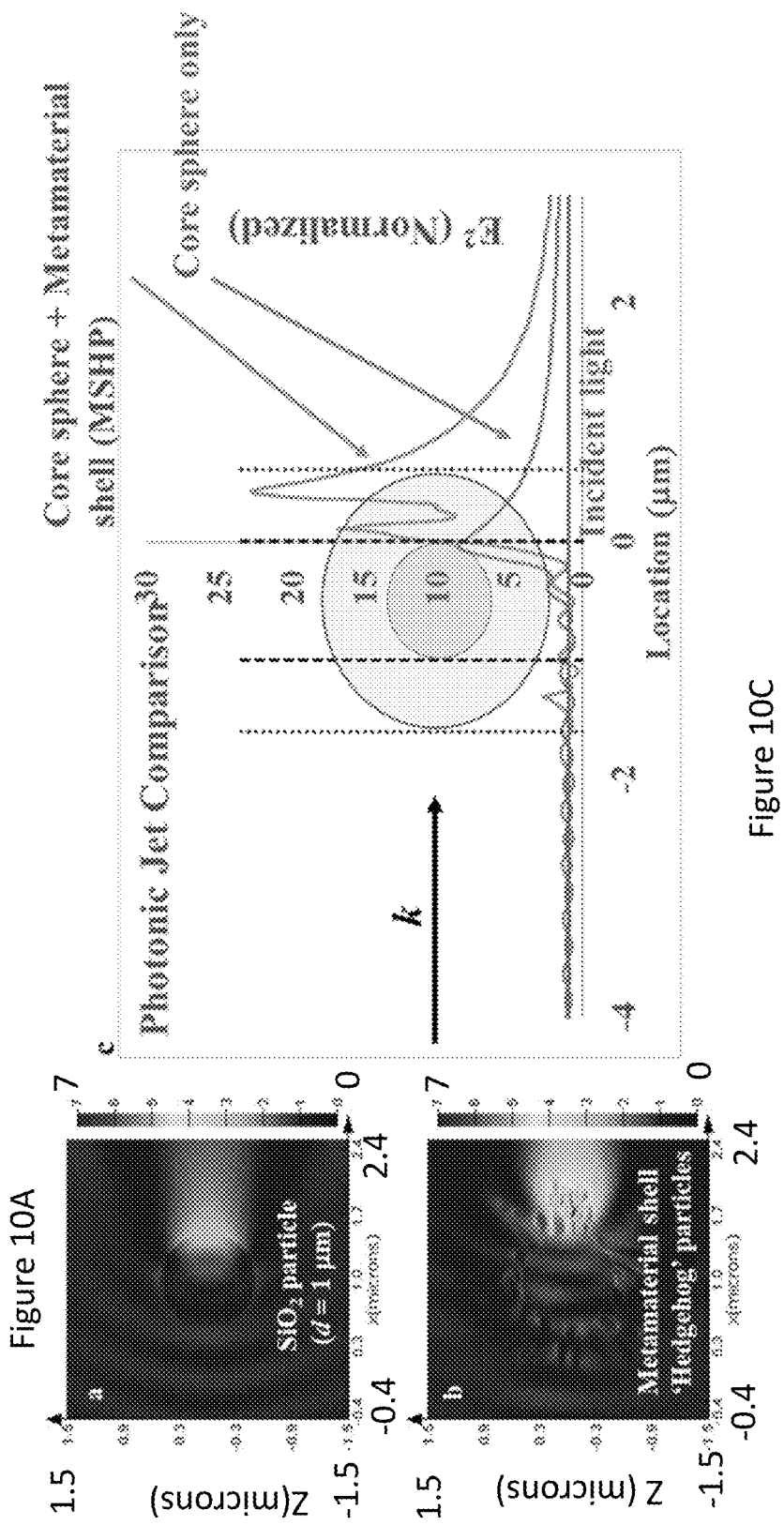
FIGS. 10A-10C. Comparison of photonic nanojets between a metamaterial shell particle and a dielectric sphere representing the core of the metamaterial shell particle. FDTD simulation showing the electric field of the photonic nanojet produced (FIG. 10A) by a silica particle (d=1 µm) representing the core, and (FIG. 10B) by a metamaterial shell particle; The photonic nanojet mode volume in the metamaterial shell particle is completely exterior of its core sphere, (FIG. 10C) There is an approximate 4-fold increase in the electric field intensity in the photonic nanojet volume at the shadow side of its core sphere in the presence of the metamaterial shell.

As illustrated in FIG. 10, this spatial distribution also tailors the nonlinear scattering of the electromagnetic radiation and enables efficient conversion of fundamental waves into second harmonic generation or other higher order harmonics. For example, second order (or higher order) nonlinear conversion efficiency can be increased when the photonic nanojet forms a regional high intensity field that spatially localizes within the metamaterial shell and interacts more effectively with the nanoscale unit building blocks having the $2^{nd}$ order (or higher order) nonlinearity. Furthermore, tailoring the spatial distribution of the electromagnetic field also generates a nonlinear output that is directional and/or localized. Directional and localized electromagnetic fields and nonlinear generation are highly desirable for photocatalysis/photocatalytic reactions.

(e) Tailoring Hyperbolic Response

Figure 11:
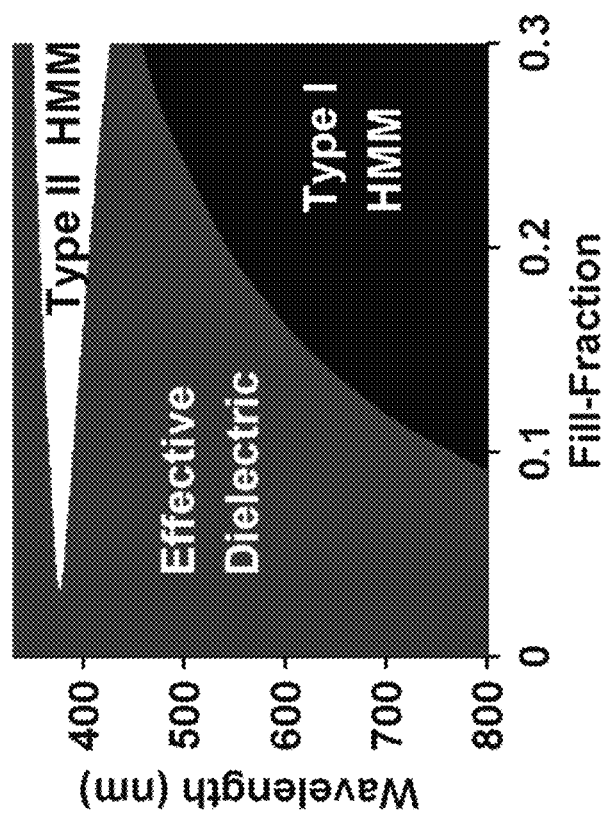
FIG. 11. Effective response of silver nanowires in alumina matrix. By changing the filling fraction of the nanowires, we can make a transition from dielectric response to hyperbolic metamaterial (HMM) response. (Taken from Reference: CL Cortes, W Newman, S Molesky, Z Jacob Journal of Optics 14 (6), 063001, 2012)
Figure 12:
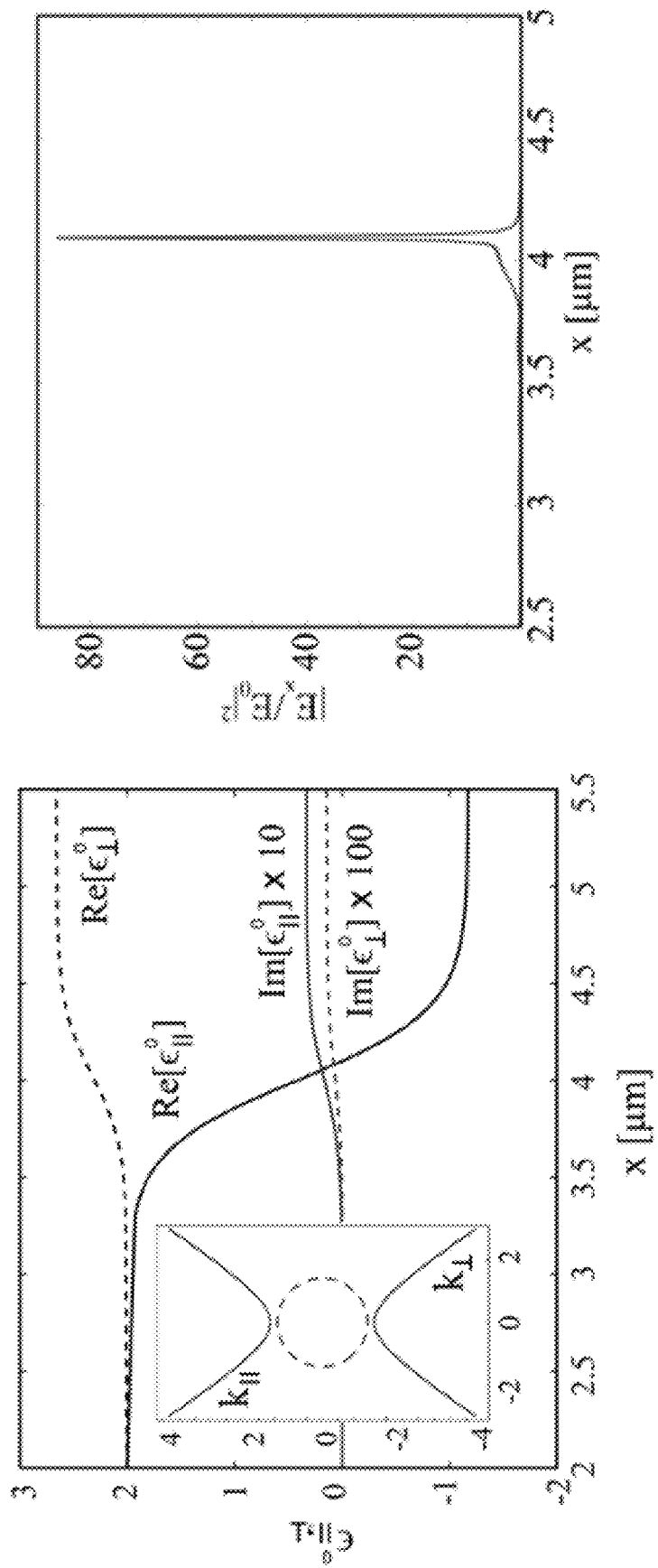
FIG. 12. Field enhancement in transition hyperbolic metamaterials. The left panel shows the position-dependent effective permittivity in the direction parallel to the axis of the nanowire. The right panel shows the electric field as a function of the position. It is seen that there is a strong field enhancement at the transition point. (Taken from reference: B Wells, Z A Kudyshev, N Litchinitser, V A Podolskiy ACS Photonics 4 (10), 2470-2478, 2017).

FIGS. 11-12 illustrate how a 2D array of metallic nanowires exhibits hyperbolic metamaterial properties for a range of filling factors, which means that the effective permittivity has opposite signs in different directions. If the metamaterial shell is composed of metallic nanowires, it can also exhibit hyperbolic properties. Because of the graded-index profile of the shell, the density of the nanowires reduces as the distance from the centre of the particle increases. Hence, if the nanowires comprise a material with metallic properties, the effective response of the shell has different optical properties at different distances. For example, if the operating wavelength is close to the transition point from a hyperbolic to dielectric metamaterial, the change in the density causes that the effective response of the shell closer to the centre have a hyperbolic property, but far from the centre, it has dielectric properties. At the transition point, the effective permittivity in the radial direction becomes zero. This leads to a very sharp peak in the electric field and this field enhancement can be used to enhance the nonlinearity of the particle, sensing, of the light, and switching of the light.

(f) Planckian Thermal Emission (Controlling Black-Body Emission)

If the metamaterial shell has a hyperbolic response, the density of states is unbounded in the hyperbolic range. This causes a singularity in the density of states of the shell. The singularity in the density of states can be used create a large Purcell effect which can in turn be used to achieve super-Planckian near field thermal radiation. Tailored Planckian thermal emission is useful for thermophotovoltaic applications.

Further Design Examples and Theory

To understand the light confinement mechanism so as to provide an example design methodology for these particles (but without being bound by a particular scientific theory), we first look at the wave equations in media with spherical anisotropy. Since, the magnetic modes (TE modes) are not affected by the non-magnetic anisotropy, we only focus on the electric modes (TM modes) here. The wave equation in uniaxial media with optical axis in the r direction can be written as (see supplementary information):

$$-\frac{1}{\varepsilon_\perp}\frac{1}{r^2}\frac{\partial}{\partial r}\left(r^2\frac{\partial}{\partial r}(rE_r)\right) + \frac{1}{\varepsilon_r r^2}\vec{L}^2(rE_r) = k_0^2(rE_r), \quad (1)$$

where $$\hbar\vec{L} = \frac{\hbar}{i}(\vec{r}\times\vec{\nabla})$$

is the angular momentum operator with an eigenvalue of $\hbar\sqrt{n(n+1)}$ and n is an integer describing the angular momentum mode number [17]. The first term on the left-hand side of Eq. 1 corresponds to the radial momentum with an eigenvalue of $\hbar k_r$, which can be expressed as [Supplementary information]:

$$\frac{k_r^2}{\varepsilon_\perp} + \frac{n(n+1)}{\varepsilon_r r^2} = k_0^2. \quad (2)$$

The radial component of the electric field in a homogeneous media with spherical anisotropy excited by a plane wave can be written as a superposition of orthogonal modes [Supplementary Information]:

$$E_r(r,\theta,\varphi) = \frac{1}{(k_0 r)^2}\sum_{n=1}^{\infty} c_n z_{n_e}\left(k_0\sqrt{\varepsilon_\perp}\,r\right)P_n^{(1)}(\cos\theta)e^{\pm i\varphi},$$

$$n_e = \sqrt{\frac{\varepsilon_\perp}{\varepsilon_r}n(n+1) + \frac{1}{4}} - \frac{1}{2},$$

where $P_n^{(1)}$ is the associated Legendre polynomial of the first order, $z_n$ is one of the Ricatti-Bessel functions or their superposition [4, 47], $c_n$ is the amplitude of the $n^{th}$-mode, $k_0=\omega/c$ is the momentum in free-space, w is the angular frequency, and c is the speed of light in vacuum.

FIG. 13 displays the electric field in media with and without spherical anisotropy. We have plotted only the first and the fifth modes. Without the loss of generality, the same arguments can be applied to other electric modes as well. By increasing the angular momentum mode number, as seen in Eq. 2, the radial momentum reduces, and at some point, it becomes imaginary. This causes the field decays faster when it approaches toward the center, which hampers light concentration with large angular momentum in sub-wavelength regime in isotropic structures. This also causes a weak radiation of generated light in the sub-wavelength regime [19].

Figure 13A:
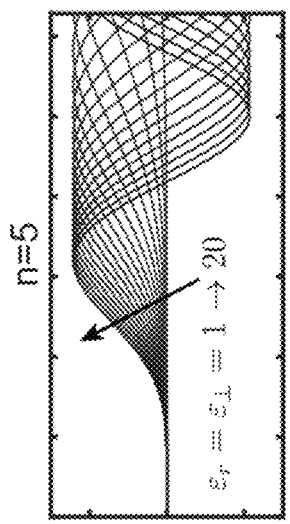
FIGS. 13A-13C: Field distribution in an infinite homogeneous media with radial anisotropy. Normalized electric field distribution for the first (left) and the fifth (right) electric modes as a function of permittivity.

Increasing the refractive index in isotropic media can compress modes in the radial direction which results in increasing the radial momentum as well as enhancing the penetration of evanescent waves toward the center (FIG. 13(a)).

Figure 13B:
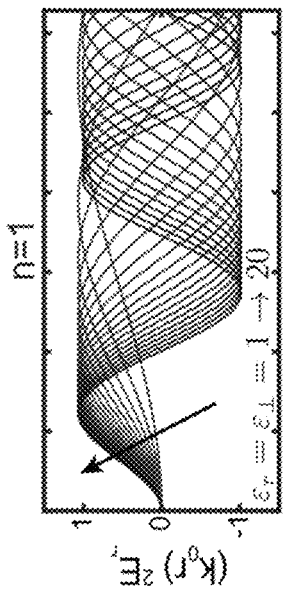

Although the far-field momentum is independent of $\varepsilon_r$ as seen in Eq. 2, increasing $\varepsilon_\perp$ alone does not enhance the field near the center (FIG. 13(b)). This is due to the suppression of evanescent waves [20]. This type of anisotropic media can be utilized to control the total internal reflection and to confine evanescent waves inside an isotropic core [20, 21, 30, 29, 32, 12].

Figure 13C:
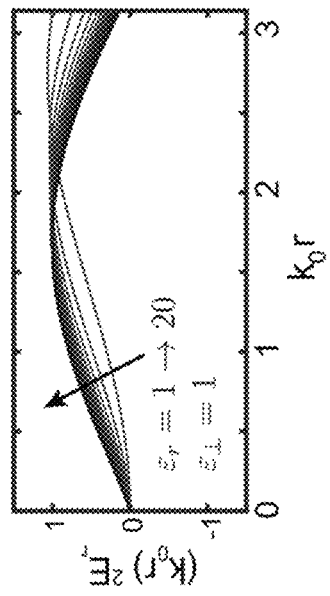

On the other hand, if we increase the anisotropy in the opposite direction, as shown in FIG. 13(c), near-field evanescent waves can be enhanced without a significant change in the momentum away from the center. The field enhancement using this approach in subwavelength regime is more substantial than increasing the permittivity in isotropic media (see the Supplementary Materials) even though the averaged permittivity in the anisotropic media is lower. This can lead to a strong conversion of reactive (evanescent) fields near the center into propagating electromagnetic waves even without using hyperbolic structures [19]. As a result, beside the field enhancement, it is expected that the radiation from a particle composed of a material with radial anisotropy to outperform an isotropic dielectric nanoantenna.

Figure 14:
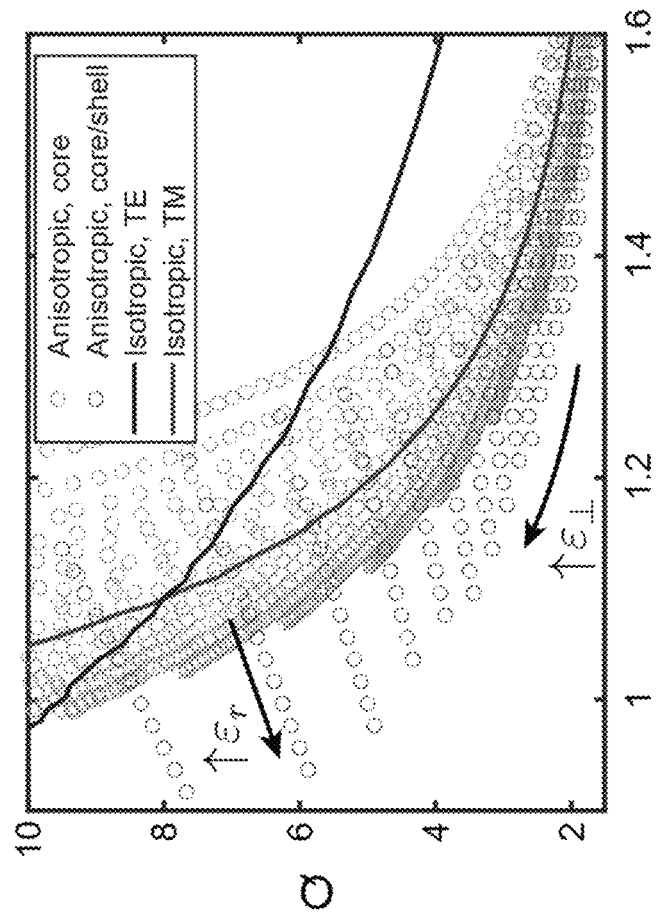
FIG. 14: Comparing the Q value versus the size in different types of spherical all-dielectric particles ($\varepsilon_{ij}>1$ and $\mu=1$). Each point represents the resonant frequency and the Q of the lowest order mode for a given value of anisotropy with a fixed total size (R). The core in core/shell structure is isotropic with $\varepsilon=2.2$ and the size of the particle is the same as that shown in FIG. 1a. Note that the magnetic modes are not affected by the dielectric anisotropy. The radial anisotropy can help to surpass the limit on the minimum radiation quality factor of dielectric antennas.

To describe the radiation properties of an anisotropic nano-antenna, we have calculated the Q values in anisotropic spherical particles compared to the isotropic case (FIG. 14). The Q of an antenna is defined by the power radiated by the antenna and the reactive energy stored in it ($Q=\varepsilon W_{stored}/P_{radiated}$), and it specifies the inherent limitation of the physical size of an antenna on its performance has been explored in the classical works by Chu, Wheeler, and others [62, 9, 10, 58, 68, 33]. Although increasing the Q is desirable for field enhancement and increasing light-matter interaction in a resonator [60], it causes an increase in reactive power resulting inefficient coupling of light from and into the far-field. In bulk Fabry-Perot or whispering-gallery-mode resonators, efficient coupling is still achievable by evanescent coupling or impedance matching of the input port. However, in nano-scale resonators in which multipolar modes can only be excited from the far field, the radiation properties of the resonator play significant roles for light-matter interactions. FIG. 3 displays the Q factor of the first electric and the first magnetic modes in isotropic and anisotropic particles. The Q factor in core/shell anisotropic structures can be reduced and approach the Chu limit of dielectric antennas [55]. The same approach can also be used to improve the radiation of dielectric resonant antennas in the microwave regime where strong anisotropy is more accessible [7]. A similar argument can be applied to the higher order electric modes.

Figures 7A, 7B, 7C:
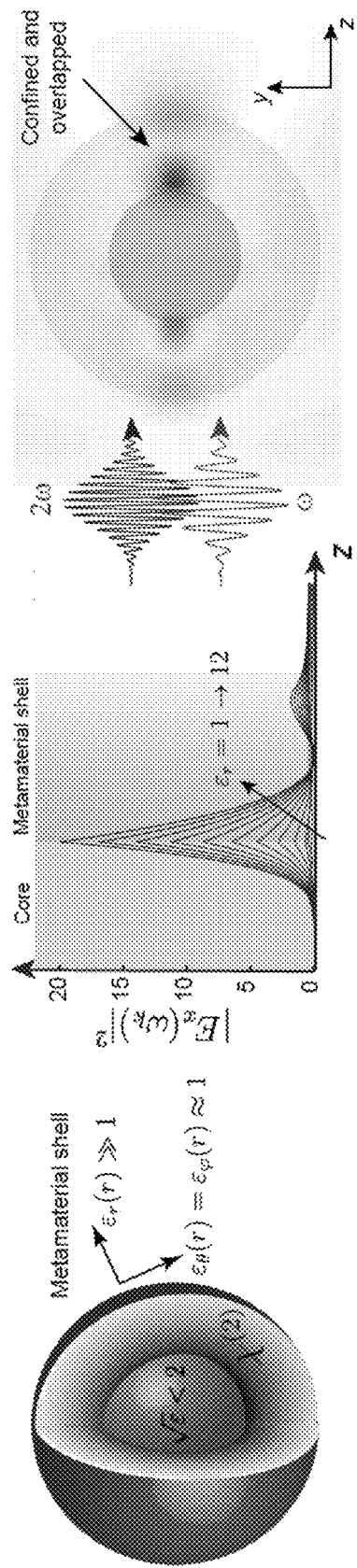
FIGS. 7A-7C: Confining light in anisotropic metamaterial particles to enhance nonlinear interaction.
Figure 8A:
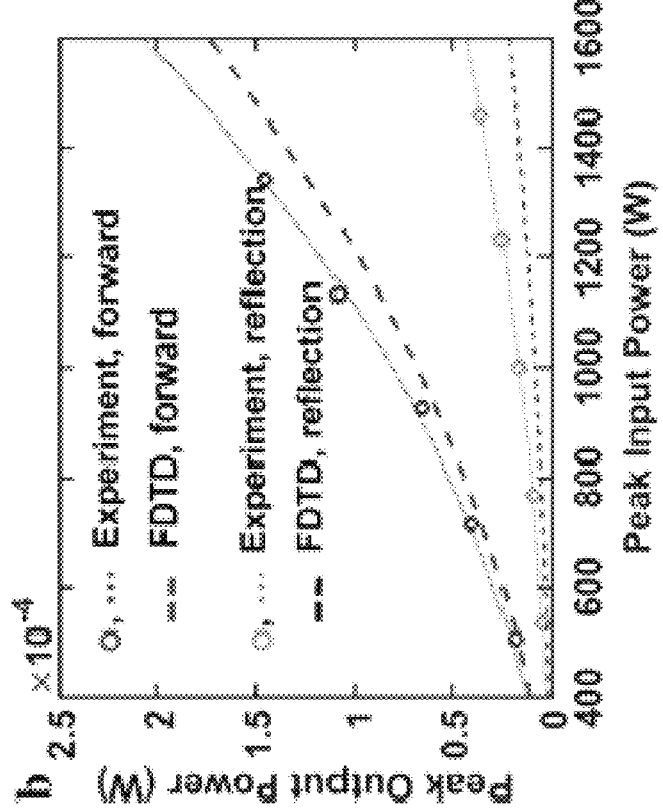
FIGS. 8A-8C: Second-harmonic generation in particles with anisotropic metamaterial shell.
Figure 8B:
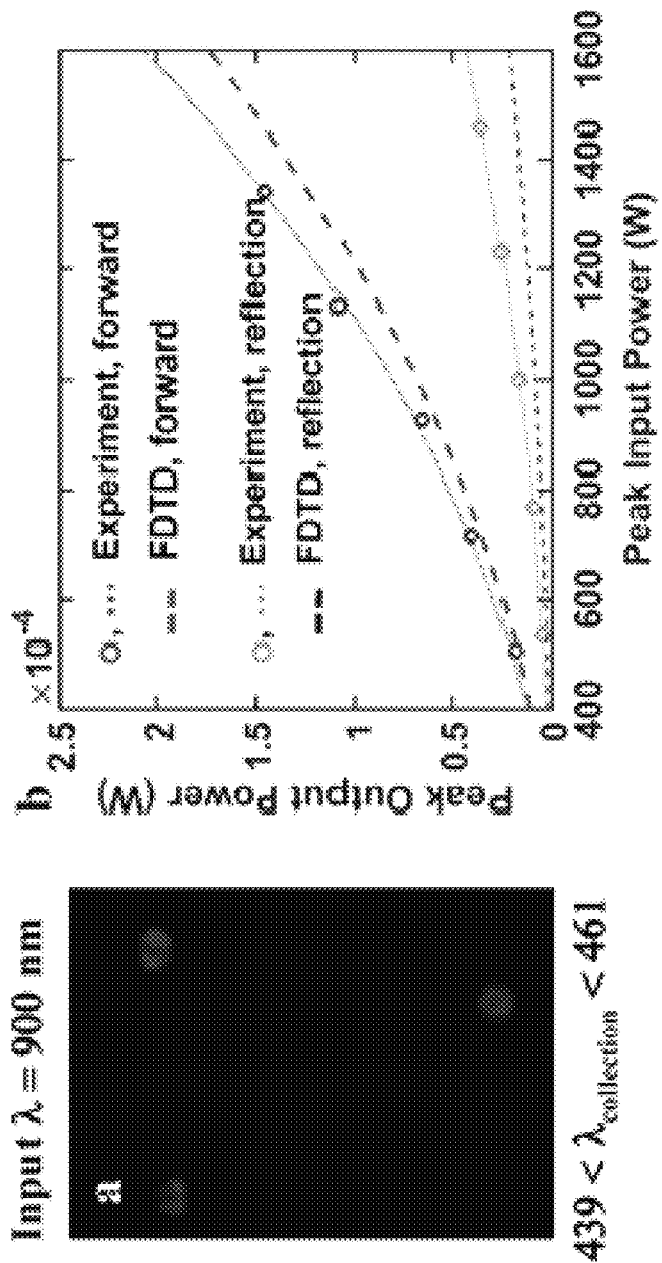
Figures 8C, 8D, 8E, 8F:
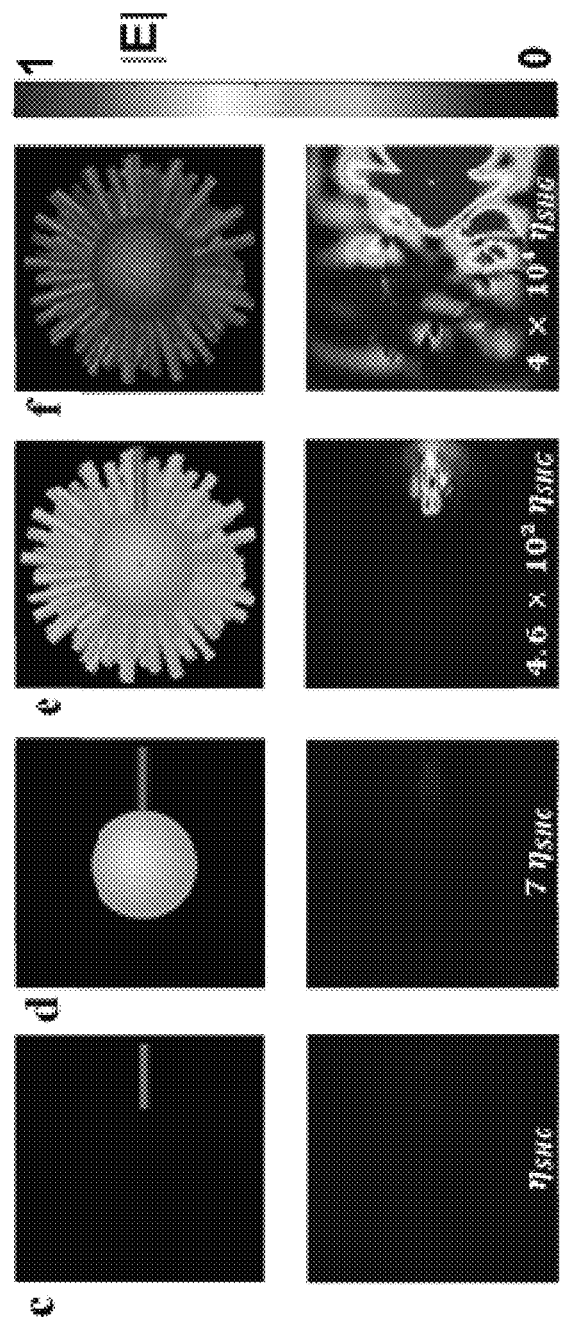
FIG. 8D shows second-harmonic generation efficiency as a function of the pump wavelength. All the contributing modes at the pump and the signal wavelengths are taken into account. The efficiency boosts as the second-harmonic wavelength approaches the resonance of the $13^{th}$ electric mode.
FIGS. 8E-8F. The FDTD simulation of the predicted quadratic relationships for the reflected (—', η=8.53×10$^{-12}$ W$^{-1}$) and forward scattered (—, η=6.81×10$^{-11}$ W$^{-1}$) SHG are also plotted: c-f, FDTD simulation showing 4 orders of magnitude enhancements in the SHG conversion efficiencies η between a model MSP2.2 and a ZnO NR. The input pulse centered at 1550 nm($f_{rep}$=100fs) is used in the simulation and the heat map depicts ||E | + of the SHG generated.
Figures 8G, 8H, 8I:
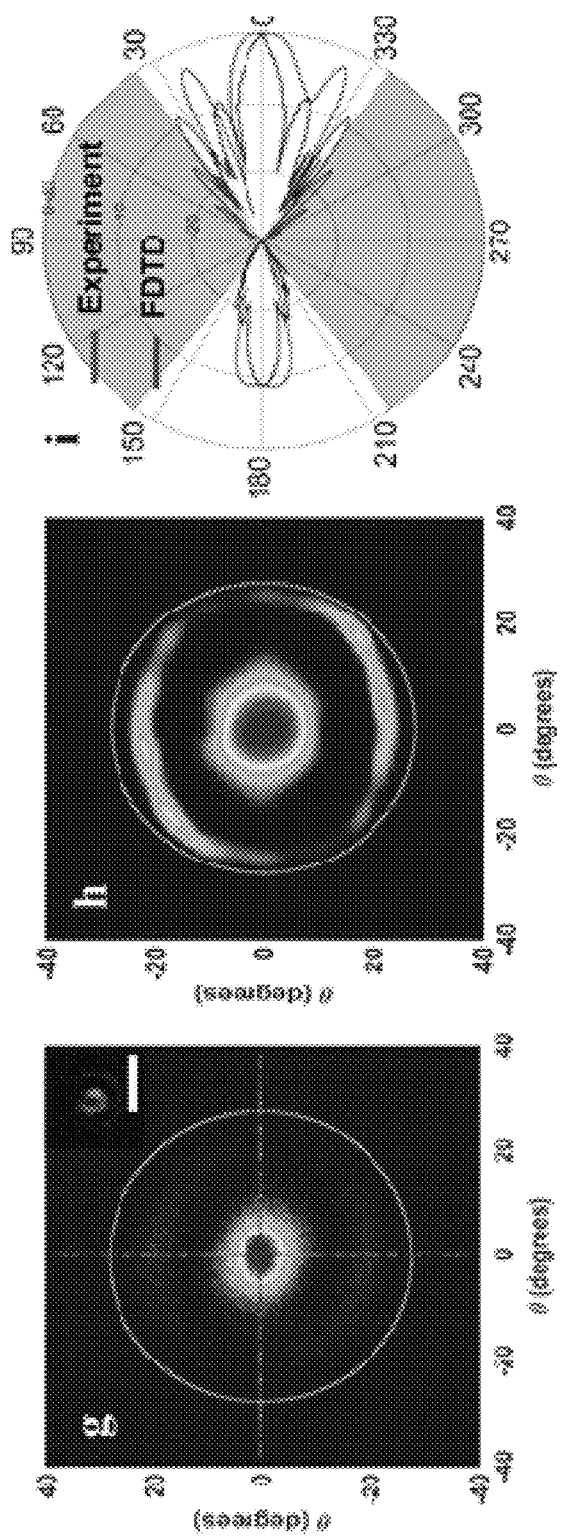
FIG. 8G. FFT far field radiation pattern. The inset is the experimental radiation image.
FIG. 8H. FDTD simulation of the far field radiation pattern of the forward scattered SHG Dotted circle represents the angle of collection for the forward scattered SHG.
FIG. 8I. The directivity plot showing enhanced forward scatter of the SHG, with F/B=6.45 (—experiment, —simulation). The MSP employed for the study here are samples from FiG. 5D (MSP2.2). All scale bar:5 µm.

As described above, a particle composed of a low-index core and an anisotropic shell (FIG. 7(a)) can enhance and confine light at the core/shell interface. The evanescent field enhancement because of the anisotropy of the shell as well as the field enhancement in low-index core because of the continuity of the normal component of the displacement current lead to generation of a hot-spot at the boundary for electric modes (FIG. 7).

Figure 15A:
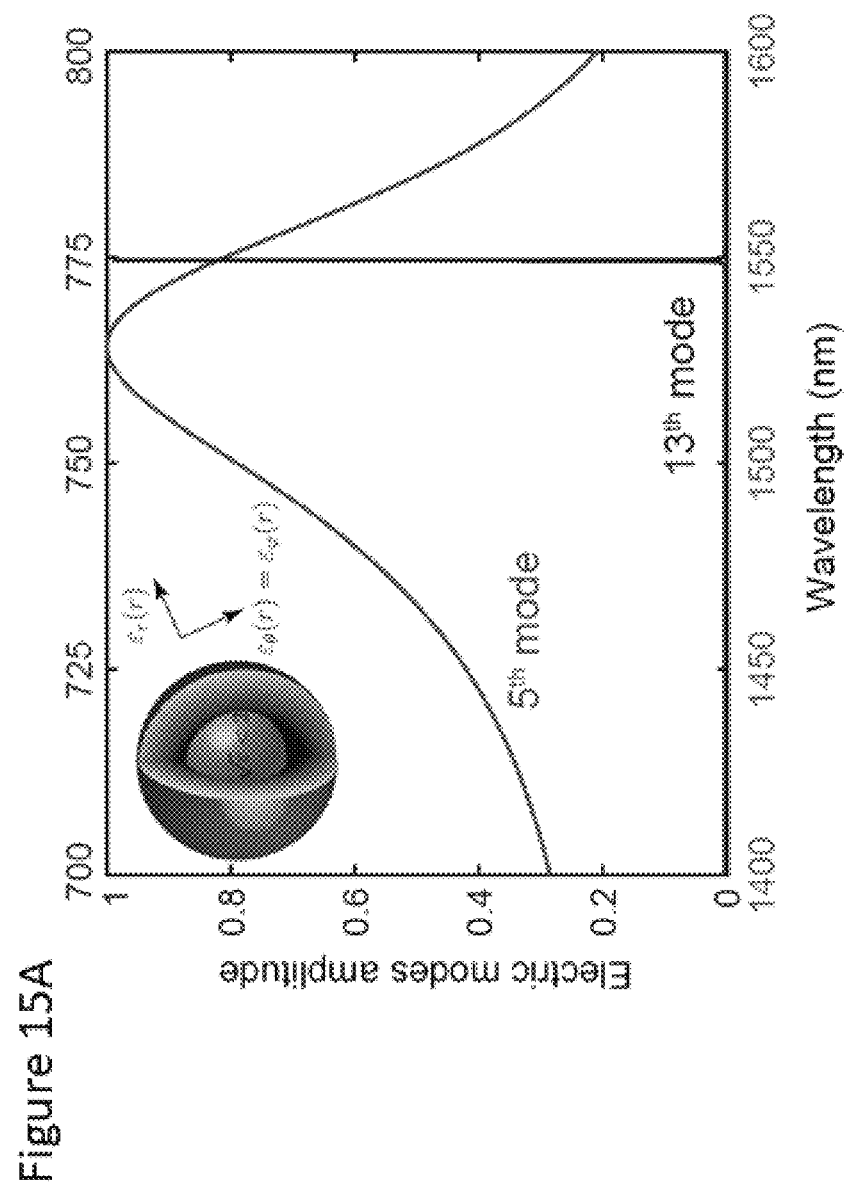

Since all the excited electric modes are confined at the core/shell interface, there is a strong spatial overlap between different harmonics at the hot-spot. This can lead to enhanced nonlinear wavelength conversion in these particles. We consider an extreme anisotropy for the shell (inset of FIG. 15(a)) to emphasize the role of anisotropy for light confinement and wavelength conversion. The scattering coefficients for the electric and magnetic modes are displayed in the Supplemental Material. As expected, the magnetic modes are not altered by the shell since they are TE modes. However, the electric modes are significantly affected by the anisotropic shell leading to a field enhancement.

We choose the fundamental harmonic to resonate at the $5^{th}$ electric mode. The second harmonic spectrally overlaps with the $13^{th}$ electric mode. The scattering coefficient for these modes are plotted in FIG. 15(a). The scattering coefficient of other modes are illustrated in the Supplementary Materials. There is a good spectral overlap between the second-harmonic of the $5^{th}$ with the $13^{th}$ modes. Hence, they can be employed for the SHG and optical parametric oscillation processes. We first look at the SHG process in these particles. We have assumed that the core has no nonlinearity and the shell has a second-order nonlinearity with $\chi^{(2)}=200$ μm/V. We excite the particle with a plane wave which excites multiple modes of the particle (FIG. 15(b)) at fundamental harmonic. At second-harmonic, multiple modes can resonate as well. However, since the $13^{th}$ electric mode has the highest Q around the second harmonic (FIG. 15(c)), most of the pump power is converted to this mode if the detuning from the resonant frequency is negligible [24, 1]. The calculated SHG efficiency considering all the contributing modes is plotted in FIG. 15(d). The SHG efficiency can reach up to $2\times10^{-3}$ W$^{-1}$ near the resonance. The highest measured SHG efficiency in single dielectric particles is $\sim10^{-5}$ W$^{-1}$ [6, 26]. It is noteworthy that using higher order modes in isotropic high-index dielectrics does not considerably improve the SHG efficiency without leveraging the phase matching [13].

We have proposed the possibility of parametric oscillation in wavelength-scale resonators [24]. Optical parametric oscillators (OPOs) can generate entangled photon pairs and squeezed vacuum states below the oscillation threshold [63, 39, 41], while above the threshold at which the gain exceeds loss, they can generate mid-IR frequency combs which can be used for many applications, such as metrology, spectroscopy, and computation at degeneracy [11, 40, 36]. As we miniaturize a conventional resonator, the nonlinear gain is reduced and field overlap deteriorates if there is no phase matching. As a result, it becomes extremely difficult to surpass the threshold. Since the SHG efficiency is strikingly high in the anisotropic particles introduced here, it is expected to achieve a low oscillation threshold in these particles as well.

Figures 16A, 16B:
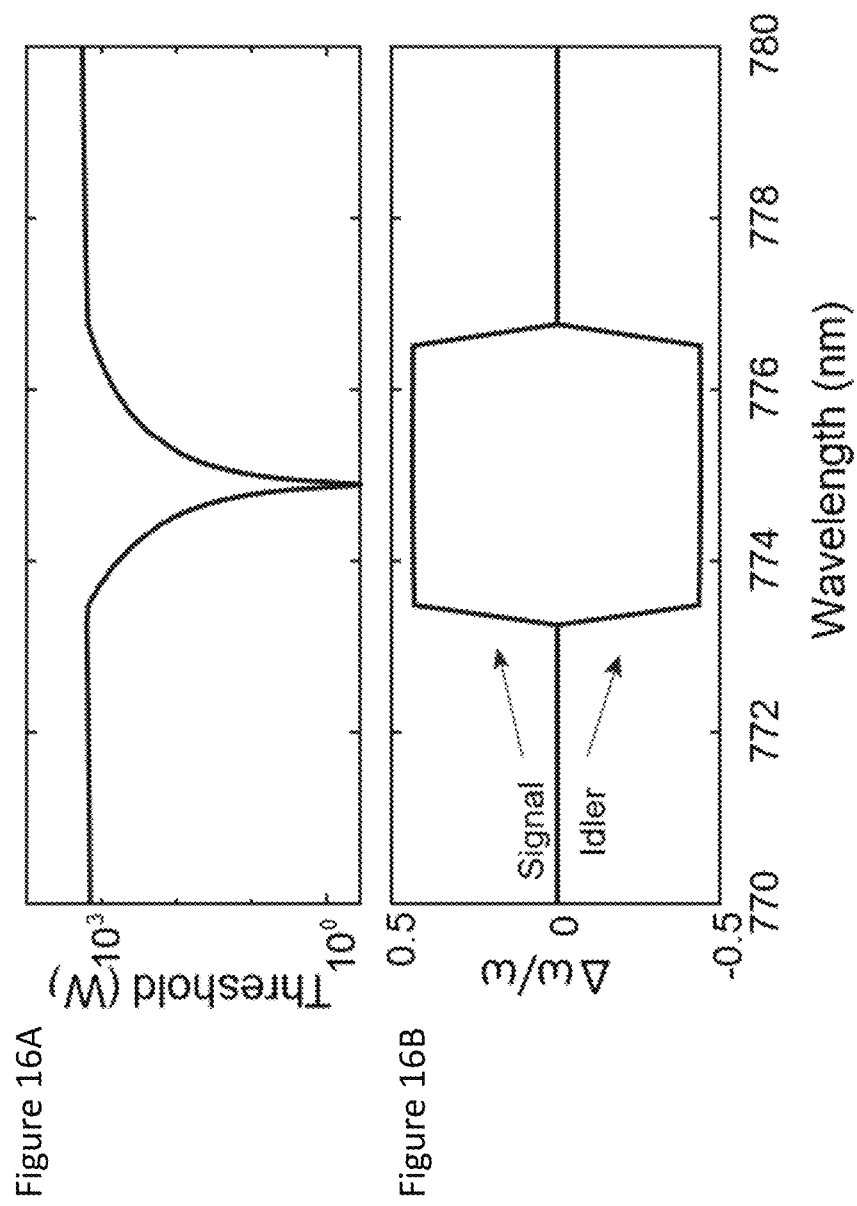
FIGS. 16A-16B. Optical parametric oscillation in particles with anisotropic metamaterial shell. The structure is the same as shown in FIG. 7A.

FIG. 16(a) displays the OPO threshold of the first oscillating mode. The minimum threshold is around 0.37 W which happens when the pump overlaps with the $13^{th}$ electric mode. This threshold is one order of magnitude lower than an isotropic particle with similar values for Q and nonlinearity [24]. This improvement is due to the field enhancement and localization which is not achievable in isotropic particles. Due to the detuning of the resonant frequency of the signal/idler from the fundamental harmonic, the signal and idler separation is large. However, the nonlinear interactions between them can lead to a phase transition from non-degenerate to degenerate case [24, 52]. By engineering the resonant frequency of the modes and reducing the detuning, the OPO threshold can be reduced further.

It is noteworthy that even away from the center of the resonance of the 13$^{th}$ electric mode, the nonlinear response is still significant compared to an isotropic particle [24]. Especially for OPO case, if we are in the low-Q regime, we can compress the pump into an ultra short pulse which can lead to a considerable reduction in the threshold.

In this section we showed that in media with spherical anisotropy, the evanescent fields can be enhanced in the sub-wavelength regime without a significant change in the field profile. This field enhancement in sub-wavelength regime, is even stronger than the field enhancement in high-index isotropic media. This allows to confine light in particles with a low-index core and an anisotropic metamaterial shell and localize modes at the core/shell interface for all the electric modes. Controlling the evanescent waves in the sub-wavelength regime can also improve the radiation properties of the nanoantennas which is essential for the efficient excitation and the collection of generated light. Our approach also suggests a strong field overlap between different harmonics. We have shown that if the shell is composed of a material with second-order nonlinearity, we can enhance the SHG efficiency and reduce the threshold of OPOs. Particles with anisotropic shell are achievable at optical frequencies [1, 44, 32], and they can open opportunities for exploring nonlinear optics at nano-scale. Even though we have focused on light confinement in spherical particles with an anisotropic shell, the same concept can be applied to other geometries including, but not limited to, cylindrical Mie resonators.

Process Steps

Figure 17:
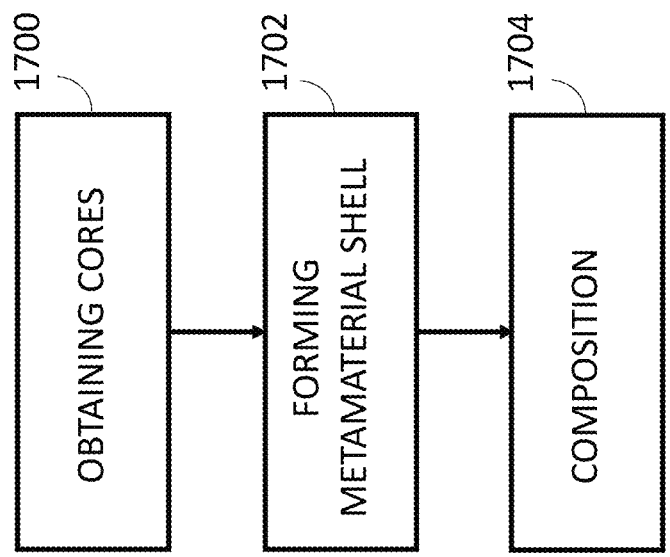
FIG. 17. Flowchart illustrating a method of making a composition of matter according to methods described herein.
Figures 18A, 18B:
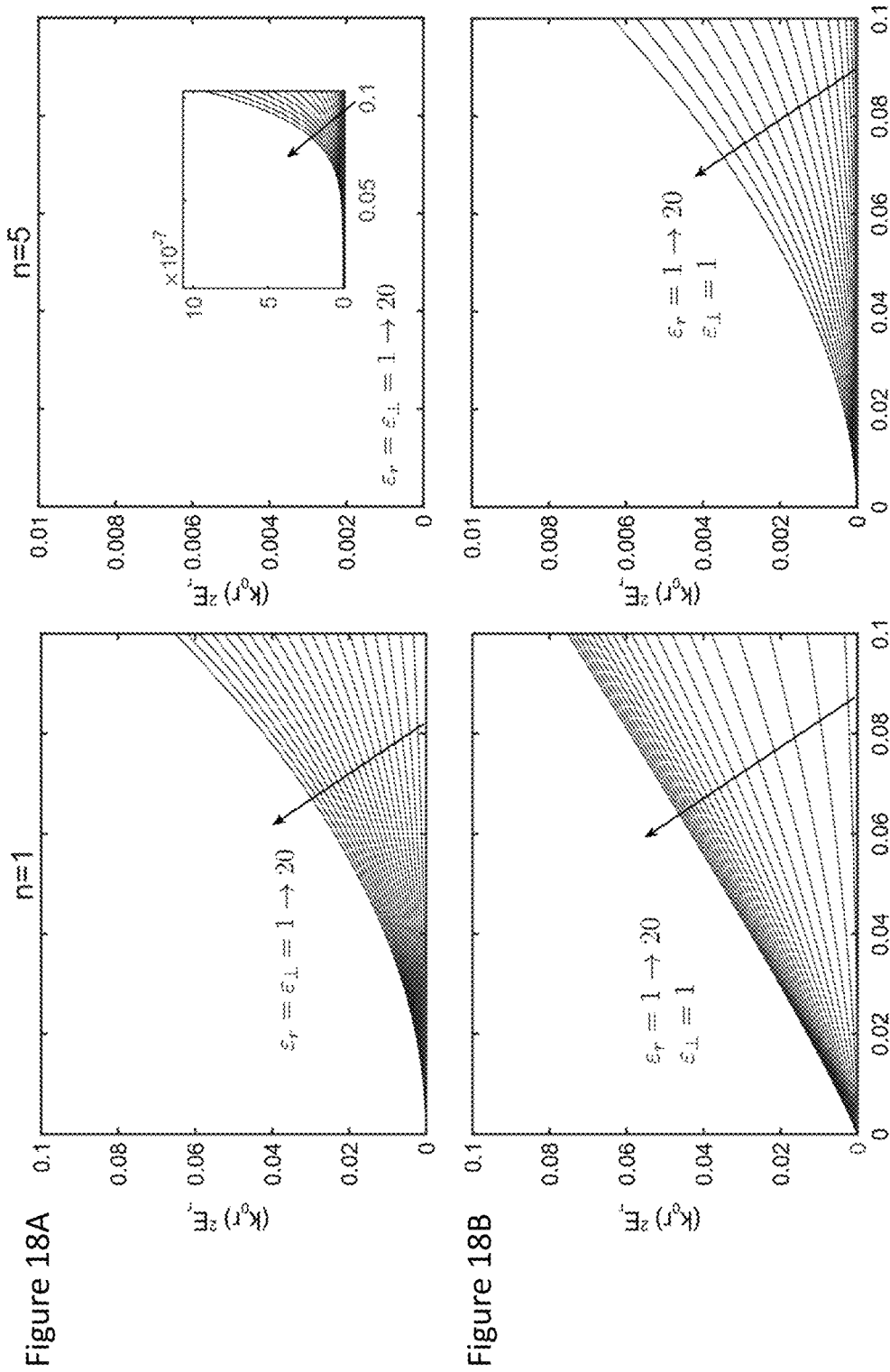
FIGS. 18A-18B: Field distribution in an infinite homogeneous media with radial anisotropy. Normalized electric field distribution for the first (left) and the fifth (right) electric modes as a function of permittivity.

FIG. 17 is a flowchart illustrating a method of making a composition of matter.

Block 1700 represents obtaining one or more cores (e.g., a spherical core or core comprising a sphere or cylinder, or other solid of revolution about an axis).

Block 1702 represents forming a metamaterial shell on each of the cores, wherein the metamaterial shell comprises structures having at least one dimension smaller than a wavelength of the electromagnetic radiation interacting with the particles, wherein the forming comprises bottom up fabrication including deposition in three dimensions from a surface of the core so as to form a solid of revolution about an axis of revolution (e.g., a sphere, spheroid, or cylinder).

Block 1704 represents the end result, a composition of matter (as illustrated in, and referring also to, FIGS. 1-16).

Illustrative, non-exclusive examples of inventive subject matter according to the present disclosure are described in the following enumerated paragraphs.

1. A composition of matter (100) useful for interacting (114) with electromagnetic radiation (102) (e.g., comprising an electromagnetic field and wave), comprising:
   one or more particles (104), wherein each of the particles (104) comprises a core (106) and a metamaterial shell (108) around the core (106), and wherein the metamaterial shell (108) comprises structures (110) having at least one dimension (112, 206) (e.g., largest dimension or outer diameter, length, width, or thickness) smaller than a wavelength of the electromagnetic radiation (102) interacting (114) with the particles (104).

2. The composition of example 1, wherein the metamaterial shell (108) comprises one or more conformal layers (200) conformal with a surface (202) of the core (106).

3. The composition of example 1 or 2, wherein the structures (110) comprise particulates (204) or conformed particles (104) so that the metamaterial shell (108) comprises an assembly of nanoparticles, each of the nanoparticles having the at least one dimension (112, 206) smaller than the wavelength of the electromagnetic radiation (102).

4. The composition of matter (100) of any of the examples 1-3, wherein the structures (110) (e.g., nanowires) have a length and a width, wherein the length is along a direction extending from a surface (202) of the core (106) and the length is longer than the width so that the interaction of the electromagnetic radiation (102) with the structures (110) is anisotropic across the shell (108).

5. The composition of matter (100) of any of the examples 1-4, comprising separations between the structures (110), wherein the separations vary (e.g., increase or decrease) with increasing distance in a radial direction away from the core (106) so that the electromagnetic interaction of the electromagnetic radiation (102) (e.g., field and/or wave) with the shell (108) varies or is different as a function of the distance from the core (106) (e.g., the metamaterial shell has a graded refractive index as a function of the distance from the core).

6. The composition of matter (100) of any of the examples 1-6, wherein the metamaterial shell (108) comprises at least one material selected from a metal, a plasmonic material (e.g., a material having plasmonic behaviour, or material supporting plasmons) dielectric, semiconductor, doped material, a polymer, or a two dimensional material (e.g., graphene).

7. The composition of matter (100) of any of the examples 1-6, wherein the structures (110) are chemically synthesized from a surface (202) of the core (106) using a bottom up approach.

8. The composition of matter (100) of any of the examples 1-7, wherein:
   the structures (110) are dimensioned to have the interaction comprising a near field interaction with the electromagnetic radiation (102), and
   each of the particles (104) are dimensioned so that the electromagnetic radiation (102) is coupled to the metamaterial from a far field of the electromagnetic radiation (102).

9. The composition of matter (100) of any of the examples 1-8, wherein the structures (110) are dimensioned to have a near field interaction with the electromagnetic radiation (102) after the electromagnetic radiation (102) is coupled to the metamaterial shell (108) through a near field interaction with another device or optical structure (e.g., waveguide, optical fibre, fibre coupler, probe, antenna, another particle, resonator).

10. A device (e.g., a resonator) comprising the composition of matter (100) of any of the examples 1-9, wherein the structures (110) are tailored to achieve predetermined electromagnetic resonance frequencies of the electromagnetic radiation (102) interacting (114) with the particles (104) (e.g., resonance frequencies selected or tailored for a particular application).

11. An anti-reflection coating comprising the composition of matter (100) of any of the examples 1-10, wherein the structures (110) tailor the electromagnetic resonance frequencies and an electromagnetic field profile (402) of the electromagnetic radiation (102) so as to suppress reflection of the electromagnetic radiation (102) from the anti-reflection coating in one or more directions.

12. A wavelength converter comprising the composition of matter (102) of any of the examples 1-10, wherein the structures (110) comprise a material having a nonlinear susceptibility generating an output electromagnetic field in response to the electromagnetic radiation (102) incident on/inputted into the material, wherein the output electromagnetic field has one or more output wavelengths longer or shorter than one or more input wavelengths of the electromagnetic radiation (102).

13. The wavelength converter of example 12, wherein the wavelength converter comprises an optical parametric oscillator and the output electromagnetic field has the output wavelengths longer than the input wavelengths.

14. The wavelength converter of example 12 or 13, wherein the structures and resonances tailor at least one of a spatial distribution of the field of the electromagnetic radiation and a conversion efficiency of the electromagnetic radiation into the output electromagnetic field.

15. The wavelength converter of example 14, wherein the structures and resonances increase the conversion efficiency.

16. The composition of matter of any of the examples 1-15, wherein the structures and resonances tailor a direction of non-linear scattering of the electromagnetic radiation by the metamaterial shell comprising the material having a nonlinear susceptibility (e.g., ($\chi^{(2)}$, $\chi^{(3)}$)

17. The composition of matter of any of the examples 1-16, wherein the structures tailor the resonances so that the particles have a hyperbolic response to the electromagnetic radiation.

18. A source of entangled photons comprising the wavelength converter of any of the examples 12-17, wherein the output electromagnetic field comprises two entangled photons.

19. A modulator or switch comprising the resonator example 10, wherein the structures (110) tailor the electromagnetic resonance frequencies and an electromagnetic field profile (402) of the electromagnetic radiation (102) so as to modulate or switch on and off at least one of a scattering, a transmission, an amplitude, or frequency of the electromagnetic radiation (102) according to a communication signal.

20. A device (e.g., a thermophotovoltaic device generating power from thermal energy) comprising the device or resonator of example 10, wherein the structures (110) tailor the electromagnetic resonance frequencies and an electromagnetic field profile (402) of the electromagnetic radiation (102) so as to control blackbody emission from the thermophotovoltaic device (e.g., so that the emission is Super Planckian).

21. The composition of matter or method of any of the examples 1-20, wherein the structures comprise etched features in the metamaterial shell.

22. The composition of matter or method of any of the examples 1-20, comprising a colloid including the particles.

23. A novel class of structurally hierarchical particle featuring a metamaterial shell around a core particle (e.g., metamaterial arranged in a spherical format).

24. The particle wherein the metamaterial shell has a radial graded index profile (changing density of spacing between structures in the metamaterial shell).

25. The particle wherein the shell has a radially anisotropic profile.

26. The particle wherein the effective optical response of the metamaterial shell can be engineered with proper selection of its nanoscale building blocks (sizes, constitutive properties, geometry, dimensions).

27. The particle wherein electromagnetic modes in the metamaterial shell and their spectral location can be controlled by the polarizability of the core sphere.

28. The particle wherein the dielectric particle can trigger spectral overlap between the electric dipole mode and the magnetic dipole.

29. The particle wherein the metamaterial shell's radial gradient refractive and radial anisotropy features can trigger spectral overlap between the electric and magnetic modes.

30. The particle wherein the metamaterial shell increases the field intensity in the photonic nanojet formed by the core.

31. The particle wherein the metamaterial shell increases the spatial overlap between the photonic nanojet volume and the metamaterial shell.

32. The particle wherein metamaterial shell comprises nanostructures comprising a second order nonlinear material converting pump wavelengths to other wavelengths with increased conversion efficiency.

33. The particle wherein the nonlinear generation of light by the metamaterial is directional and/or localized.

34. The particle, composition of matter, or method of any of the examples wherein the electromagnetic radiation has any wavelength (e.g., in a range of 300 nm to 10 microns) and the at least one dimension of the structures is in a range of 1-1000 nm (nanometers).

35. A method of making a composition of matter (100) useful for interacting (114) with electromagnetic radiation (102), comprising:
  forming a metamaterial shell (108) on a core (106), wherein the metamaterial shell (20) (108) comprises structures (110) having at least one dimension (112, 206) smaller than a wavelength of the electromagnetic radiation (102) interacting (114) with the particles (104), wherein the forming comprises bottom up fabrication including deposition in three dimensions from a surface (202) of the core (106).

36. The method of example 35, wherein the forming comprises at least one of chemical synthesis on the core (106) or etching a material deposited on the core (106).

37. The method of example 36, wherein the forming comprises assembling and conforming the structures (110) comprising nanoparticles onto the surface (202) of the core (106), each of the nanoparticles having at least one dimension (112, 206) smaller than the wavelength of the electromagnetic radiation (102).

38. The method of example 35 or 36, wherein the structures (110) have a length and a width, the length is along a direction extending from a surface (202) of the core (106) and the length is longer than the width so that so that the interaction of the electromagnetic radiation (102) with the structures (110) is anisotropic across the shell (20).

39. The method of any of the examples 35-38, wherein the structures (110) are engineered so that the interaction with the electromagnetic radiation (102) with the structures (110) controls at least one of a reflection, transmission, absorption, scattering, wavelength conversion, electromagnetic-matter (100) interaction, or all optical switching of the electromagnetic radiation (102).

40. The composition of matter (102) of any of the examples 1-39, wherein the metamaterial shell (108) demonstrates (or the comprises) effective anisotropy in the refractive index having an optical axis in the radial direction (r).

41. The composition of matter (102) of any of the examples 1-40, wherein the metamaterial shell (108) demonstrates (or comprises) graded-index profile in the effective refractive index in the radial direction (r).

42. The composition of matter (102) of any of the examples, wherein the shell (108) comprises a roughness and/or the structures (110) each comprises distinct segments, portions, members, or cells of the shell (108).

Further information on one or more embodiments of the present invention can be found in [1].

Advantages and Improvements

Embodiments of the present invention disclose a paradigm shift in light confinement approaches and nonlinear optics at nano-scale using low-index particles surrounded by all-dielectric anisotropic metamaterial shell ($\varepsilon_r \gg 1$, $\varepsilon_\perp = \varepsilon_\theta = \varepsilon_\varphi \approx 1$, and $\mu_{ij}=1$). The anisotropy of the shell gives us two degrees of freedom to independently control the radial momentum of light and the penetration of large angular momentum states toward the center. Hence, we can enhance the field intensity without a significant change in the field profile (FIG. 7(b)). This allows us to achieve field confinement as well as strong overlap between harmonics (FIG. 7(c)) leading to enhanced wavelength conversion in these particles. We show that the radial anisotropy can also help to convert reactive energy near the center into propagating waves, and as a result, the radiation properties of these particles are remarkably improved. As a result, the efficiency of the coupling of input light and collection of the output light is enhanced. We estimate the second-harmonic generation (SHG) efficiency as well as the optical parametric oscillation threshold in these particles. We discuss that the nonlinear response in the proposed particles can be orders of magnitude higher compared to a high-index isotropic particle with similar nonlinear coefficient and Q factors.

In one example, the metamaterial shell is composed of dielectric nanowires arranged in spherical form [1, 2]. Due to the sub-wavelength feature size of the unit-cell in the shell, Maxwell-Garnett effective medium theory can be applied to model the effective response of the shell [20]. Since the nanowires are mostly oriented in the radial direction, the nanowires demonstrate an effective spherical anisotropy. Also, as the distance from the center is reduced, the nanowires filling factor reduces while the width of the nanowires is fixed. Hence, the effective response displays a graded-index profile as well. The analytical calculation of the field distribution using a modified Mie theory is in good agreement with the full-wave simulation except near the nanowires which is due to the inhomogeneity of the real structure. The anisotropy that we have achieved with zinc oxide nanowires can be enhanced by using higher index nanowires [56] or doping the nanowires [51].

Supplemental Information

In this supplementary material, we report the wave equations in the spherical coordinate with radial anisotropy. We derive the analytical solutions to the electric and magnetic fields. We demonstrate the scattering by an anisotropic sphere excited by a plane-wave. We also compare full-wave simulation of a practical structure with our analytical calculations to confirm the validity of our model.

1 Helmholtz Equations

In a homogeneous medium with spherical uniaxial anisotopic permittivity with the optical axis in the r direction ($\bar{\bar{\varepsilon}}=[\varepsilon_r, \varepsilon_\perp, \varepsilon_\perp]$, where $\varepsilon_\theta = \varepsilon_\varphi = \varepsilon_\perp$), any arbitrary electromagnetic field in spherical coordinate can be constructed as a superposition of TM ($H_r=0$) and TE ($E_r=0$) modes. We can write the scalar Helmholtz equation for $E_r$ and $H_r$, and then derive the electric and magnetic fields in the $\theta$ and $\varphi$ directions from the fields in the r direction. For the TE modes, the Helmholtz equation can be written as:

$$(\nabla \times \nabla \times \vec{H})_r = k_0^2 \varepsilon_\perp H_r. \tag{1}$$

Since $\nabla \cdot \vec{H}=0$, the above equation is simplified to the familiar form of the wave equation [18]:

$$\nabla^2(rH_r)+k_0^2 \varepsilon_\perp (rH_r)=0. \tag{2}$$

For the TM modes, we can write the scalar Helmholtz equation for $E_r$ as:

$$(\nabla \times \nabla \times \vec{E})_r = k_0^2 \varepsilon_r E_r. \tag{3}$$

However, since $\nabla \cdot \vec{E}$ is not zero in anisotropic media, Eq. 3 is not simplified to the conventional form. Here, we show how we can write the Helmholtz equation for $E_r$ for the anisotropic case. The left hand side of the Eq. 3 can be written as:

$$\left(\nabla \times \nabla \times \vec{E}\right)_r = \frac{1}{r\sin\theta}\left[\frac{\partial}{\partial \theta}\left(\left(\nabla \times \vec{E}\right)_\varphi \sin\theta\right) - \frac{\partial}{\partial \phi}\left(\left(\nabla \times \vec{E}\right)_\theta\right)\right] = \tag{4}$$

$$\frac{1}{r\sin\theta}\left[\frac{\partial}{\partial \theta}\left(\frac{1}{r}\left(\frac{\partial}{\partial r}(rE_\theta) - \frac{\partial}{\partial \theta}E_r\right)\sin\theta\right) - \right.$$

$$\left.\frac{\partial}{\partial \varphi}\left(\frac{1}{r}\left(\frac{1}{\sin\theta}\frac{\partial}{\partial \varphi}E_r - \frac{\partial}{\partial r}(rE_\varphi)\right)\right)\right] = -\frac{1}{r^2\sin\theta}\frac{\partial}{\partial \theta}\left(\sin\theta\frac{\partial E_r}{\partial \theta}\right) -$$

$$\frac{1}{r^2\sin^2\theta}\frac{\partial^2 E_r}{\partial \varphi^2} + \frac{1}{r^2\sin\theta}\frac{\partial}{\partial \theta}\left(\sin\theta\frac{\partial}{\partial r}(rE_\theta)\right) + \frac{1}{r^2\sin\theta}\frac{\partial}{\partial \varphi}\frac{\partial}{\partial r}(rE_\varphi) =$$

$$-\nabla_\perp^2 E_r + \frac{1}{r^2\sin\theta}\frac{\partial}{\partial \theta}\left(\sin\theta\frac{\partial}{\partial r}(rE_\theta)\right) + \frac{1}{r^2\sin\theta}\frac{\partial}{\partial \varphi}\frac{\partial}{\partial r}(rE_\varphi),$$

where $\nabla_\perp^2$ is the transverse component of the Laplacian in the spherical coordinate. We can further simplify Eq. 4 by adding and subtracting the radial component of the Laplacian which is multiplied by $\varepsilon_r/(r\varepsilon_\perp)$:

$$\left(\nabla \times \nabla \times \vec{E}\right)_r = \tag{5}$$

$$-\frac{1}{r}\nabla_\perp^2(rE_r) - \frac{\varepsilon_r}{r\varepsilon_\perp}\frac{1}{r^2}\frac{\partial}{\partial r}\left(r^2\frac{\partial}{\partial r}(rE_r)\right) + \left[\frac{\varepsilon_r}{r\varepsilon_\perp}\frac{1}{r^2}\frac{\partial}{\partial r}\left(r^2\frac{\partial}{\partial r}(rE_r)\right) + \right.$$

$$\left.\frac{1}{r^2\sin\theta}\frac{\partial}{\partial \theta}\left(\sin\theta\frac{\partial}{\partial r}(rE_\theta)\right) + \frac{1}{r^2\sin\theta}\frac{\partial}{\partial \varphi}\frac{\partial}{\partial r}(rE_\varphi)\right].$$

After some algebra, it is easy to show that the last term on the right side of Eq. 5 can be written as the divergence of the displacement current:

$$\left(\nabla \times \nabla \times \vec{E}\right)_r = \tag{6}$$

$$\frac{1}{r}\left[-\nabla_\perp^2(rE_r) - \frac{\varepsilon_r}{\varepsilon_\perp}\frac{1}{r^2}\frac{\partial}{\partial r}\left(r^2\frac{\partial}{\partial r}(rE_r)\right) + \frac{1}{\varepsilon_0\varepsilon_\perp}\nabla \cdot \vec{D} + \frac{1}{\varepsilon_0\varepsilon_\perp}\frac{\partial}{\partial r}(r\nabla \cdot \vec{D})\right]$$

As $\nabla \cdot \vec{D}=0$, the Helmholtz equation for $\varepsilon_r$ can be written as:

$$\frac{\varepsilon_r}{\varepsilon_\perp}\frac{1}{r^2}\frac{\partial}{\partial r}\left(r^2\frac{\partial}{\partial r}(rE_r)\right) + \nabla_\perp^2(rE_r) + k_0^2\varepsilon_r(rE_r) = 0, \tag{7}$$

or it can be expressed as:

$$\frac{1}{\varepsilon_\perp}p_r^2(rE_r) + \frac{1}{\varepsilon_r r^2}\vec{L}^2(rE_r) = k_0^2(rE_r), \tag{8}$$

where $$\hbar p_r = \frac{\hbar}{i}(\hat{r}\cdot\vec{\nabla}) \text{ and } \hbar\vec{L} = \frac{\hbar}{i}(\vec{r}\times\vec{\nabla})$$

are the radial momentum and the angular momentum operators with eigenvalues of $\hbar k_r$ and $\hbar L=\hbar\sqrt{n(n+1)}$, respectively. Hence, the eigenvalue problem can be simplified to:

$$\frac{k_r^2}{\varepsilon_\perp} + \frac{n(n+1)}{\varepsilon_r r^2} = k_0^2. \tag{9}$$

By increase the angular momentum mode number, the second term on the left hand side of Eq. 9 exceeds the term on the right hand side, especially when we are closer to the center. As a result, the radial momentum becomes imaginary which decays evanescently when we approach the center. This causes a weak excitation of higher order modes in the sub-wavelength regime and a weak coupling of these modes to the far-field radiating modes [19].

If we rearrange the momentum as:

$$k_r = \sqrt{\frac{\varepsilon_\perp}{\varepsilon_r}}\sqrt{k_0^2\varepsilon_r - \frac{n(n+1)}{r^2}}, \tag{10}$$

it is seen that by controlling the anisotropy, we can control the evanescent fields near the center [20]. Especially, if we increase the ratio, $\varepsilon/\varepsilon_r$, the evanescent fields and as a result, the field is enhanced in the sub-wavelength regime ($k_0 r \ll 1$). FIG. 6 demonstrates the fields in the sub-wavelength regime. Intuitively, it is expected to enhance the field near the center by increasing the permittivity. However, it is seen that in the anisotropic cases, even though the averaged permittivity is lower, the field enhancement is more significant.

This field enhancement can be several orders of magnitude stronger for the higher order modes.

2 Solution to the Helmholtz Equations 2.1 Non-Magnetic Anisotropic Particle

We start with the simplest particle with non-magnetic anisotropy. We can use the approach of separating the variables to find the solutions of $E_r$ and $H_r$. Eq. 2 has the standard solution of [18]:

$$rH_r(r, \theta, \varphi) = \tag{11}$$
$$\sum_{n=0}^{\infty}\sum_{m=-n}^{n}[c_n^h j_n(k_0\sqrt{\varepsilon_\perp}\, r) + d_n^h n_n(k_0\sqrt{\varepsilon_\perp}\, r)]P_n^{(m)}(\cos\theta)\begin{Bmatrix}\sin(m\varphi)\\ \cos(m\varphi)\end{Bmatrix},$$

where $P_n^{(m)}$ are the Legendre Polynomials. $j_n$ and $n_n$ are the spherical Bessel and Neumann functions defined as:

$$j_n(x) = \left(\frac{\pi}{2x}\right)^{\frac{1}{2}}J_{n+\frac{1}{2}}(x) \tag{12}$$
$$n_n(x) = \left(\frac{\pi}{2x}\right)^{\frac{1}{2}}N_{n+\frac{1}{2}}(x),$$

where $J_n(x)$ and $N_n(x)$ are the $n^{th}$ order Bessel and Neumann functions. Sometimes, it is more convenient to write the solution as Ricatti-Bessel functions defined as [25, 4]:

$$\psi_n(x) = xj_n(x) = \left(\frac{\pi x}{2}\right)^{\frac{1}{2}}J_{n+\frac{1}{2}}(x) \tag{13}$$
$$\chi_n(x) = -xn_n(x) = -\left(\frac{\pi x}{2}\right)^{\frac{1}{2}}N_{n+\frac{1}{2}}(x),$$

or as spherical Hankel function of the first kind and second kind for outward and inward radiations, respectively:

$$h_n^{(1)}(x) = \xi_n(x)/x = j_n(x) + in_n(x)$$

$$h_n^{(2)}(x) = \zeta_n(x)/x = j_n(x) - in_n(x) \tag{14}$$

The angular part of the solution of Eq. 7 is the same as that in Eq. 11. However, the radial part is a bit more complicated than the standard form shown in Eq. 11:

$$rE_r(r, \theta, \varphi) = \tag{15}$$
$$\sum_{n=0}^{\infty}\sum_{m=-n}^{n}[c_n^e j_{n_e}(k_0\sqrt{\varepsilon_\perp}\, r) + d_n^e n_{n_e}(k_0\sqrt{\varepsilon_\perp}\, r)]P_n^{(m)}(\cos\theta)\begin{Bmatrix}\sin(m\varphi)\\ \cos(m\varphi)\end{Bmatrix},$$

where $$n_e = \sqrt{\frac{\varepsilon_\perp}{\varepsilon_r}n(n+1) + \frac{1}{4}} - \frac{1}{2}.$$

Note that if the medium is isotropic, the solution is simplified to the standard solution as shown in Eq. 11.

The tangential component of the electric and magnetic fields in the spherical anisotropic medium are expressed as:

$$i\omega\mu_0 H_\theta = \frac{1}{r}\left(\frac{1}{\sin\theta}\frac{\partial}{\partial\varphi}E_r - \frac{\partial}{\partial r}(rE_\varphi)\right) \tag{16}$$
$$i\omega\mu_0 H_\varphi = \frac{1}{r}\left(\frac{\partial}{\partial r}(rE_\theta) - \frac{\partial}{\partial\theta}E_r\right),$$

and $$-i\omega\varepsilon_0\varepsilon_\perp E_\theta = \frac{1}{r}\left(\frac{1}{\sin\theta}\frac{\partial}{\partial\varphi}H_r - \frac{\partial}{\partial r}(rH_\varphi)\right) \tag{17}$$
$$-i\omega\varepsilon_0\varepsilon_\perp E_\varphi = \frac{1}{r}\left(\frac{\partial}{\partial r}(rH_\theta) - \frac{\partial}{\partial\theta}H_r\right).$$

2.1.1 TE Modes

For TE modes, $E_r=0$, so Eq. 16 is simplified to:

$$i\omega\mu_0 H_\theta^{TE} = -\frac{1}{r}\frac{\partial}{\partial r}(rE_\varphi^{TE}) \tag{18}$$
$$i\omega\mu_0 H_\varphi^{TE} = \frac{1}{r}\frac{\partial}{\partial r}(rE_\theta^{TE}).$$

By replacing Eq. 18 into Eq. 17 and multiplying the both sides by $i\omega\mu_0 r$, we obtain:

$$\frac{\partial^2}{\partial r^2}(rE_\theta^{TE}) + k_0^2 \varepsilon_\perp rE_\theta^{TE} = \frac{i\omega\mu_0}{\sin\theta}\frac{\partial}{\partial\varphi}(rH_r) \quad (19)$$

$$\frac{\partial^2}{\partial r^2}(rE_\varphi^{TE}) + k_0^2 \varepsilon_\perp rE_\varphi^{TE} = -i\omega\mu_0 \frac{\partial}{\partial\theta}(rH_r).$$

Since the radial part of the right-hand side of Eq. 19 is a spherical Bessel function, the radial part of the left-hand side must be a spherical function too. Using the recurrence relation for spherical Bessel functions:

$$\frac{\partial^2}{\partial r^2}(rz_n(kr)) + \left(k^2 - \frac{n(n+1)}{r}\right)rz_n(kr) = 0, \quad (20)$$

where $z_n(kr)$ is a spherical Bessel, Neumann, or Hankel function, Eq. 19 is simplified to:

$$E_\theta^{TE} = \frac{i\omega\mu_0}{n(n+1)\sin\theta}\frac{\partial}{\partial\varphi}(rH_r) \quad (21)$$

$$E_\varphi^{TE} = -\frac{i\omega\mu_0}{n(n+1)}\frac{\partial}{\partial\theta}(rH_r).$$

Now if we insert Eq. 21 into Eq. 18, we can obtain the tangential component of the magnetic field:

$$H_\theta^{TE} = -\frac{1}{i\omega\mu_0}\frac{1}{r}\frac{\partial}{\partial r}(rE_\varphi^{TE}) = \frac{1}{n(n+1)}\frac{1}{r}\frac{\partial^2}{\partial\theta\partial r}(r^2 H_r) \quad (22)$$

$$H_\varphi^{TE} = \frac{1}{i\omega\mu_0}\frac{1}{r}\frac{\partial}{\partial r}(rE_\theta^{TE}) = \frac{1}{n(n+1)}\frac{1}{r\sin\theta}\frac{\partial^2}{\partial\varphi\partial r}(r^2 H_r).$$

2.1.2 TM Modes

For TM modes, $H_r=0$. If we follow the same procedure that we used for TE modes, the tangential electric and magnetic fields can be expressed as:

$$H_\theta^{TM} = -\frac{i\omega\varepsilon_0\varepsilon_\perp}{n_e(n_e+1)\sin\theta}\frac{\partial}{\partial\varphi}(rE_r) \quad (23)$$

$$H_\varphi^{TM} = \frac{i\omega\varepsilon_0\varepsilon_\perp}{n_e(n_e+1)}\frac{\partial}{\partial\theta}(rE_r),$$

and $$E_\theta^{TM} = \frac{1}{i\omega\varepsilon_0\varepsilon_\perp}\frac{1}{r}\frac{\partial}{\partial r}(rH_\varphi^{TM}) = \frac{1}{n_e(n_e+1)}\frac{1}{r}\frac{\partial^2}{\partial\theta\partial r}(r^2 E_r) \quad (24)$$

$$E_\varphi^{TM} = -\frac{1}{i\omega\varepsilon_0\varepsilon_\perp}\frac{1}{r}\frac{\partial}{\partial r}(rH_\theta^{TM}) = \frac{1}{n_e(n_e+1)}\frac{1}{r\sin\theta}\frac{\partial^2}{\partial\varphi\partial r}(r^2 E_r).$$

2.2 General Anisotropic Particle

For a particle with both electric and magnetic anisotropy ($\bar{\varepsilon}=[\varepsilon_r, \varepsilon_\perp, \varepsilon_\perp]$ and $\bar{\mu}=[\mu_r, \mu_\perp, \mu_\perp]$, where $\varepsilon_\theta=\varepsilon_\varphi=\varepsilon_\perp$ and $\mu_\theta=\mu_\varphi=\mu_\perp$), the solution for both TE and TM modes are affected by the anisotropy [49, 48, 31]. The radial component of the electromagnetic fields are written as:

$$rE_r(r, \theta, \varphi) = \sum_{n=0}^{\infty} \quad (25)$$

$$\sum_{m=-n}^{n}\left[c_n^e j_{n_e}(k_0\sqrt{\varepsilon_\perp \mu_\perp}\, r) + d_n^e n_{n_e}(k_0\sqrt{\varepsilon_\perp \mu_\perp}\, r)\right]P_n^{(m)}(\cos\theta)\left\{\begin{array}{c}\sin(m\varphi)\\ \cos(m\varphi)\end{array}\right\},$$

$$rH_r(r, \theta, \varphi) = \sum_{n=0}^{\infty}$$

$$\sum_{m=-n}^{n}\left[c_n^h j_{n_h}(k_0\sqrt{\varepsilon_\perp \mu_\perp}\, r) + d_n^h n_{n_h}(k_0\sqrt{\varepsilon_\perp \mu_\perp}\, r)\right]P_n^{(m)}(\cos\theta)\left\{\begin{array}{c}\sin(m\varphi)\\ \cos(m\varphi)\end{array}\right\},$$

where $n_e = \sqrt{\frac{\varepsilon_\perp}{\varepsilon_r}n(n+1) + \frac{1}{4}} - \frac{1}{2}$ and $n_h = \sqrt{\frac{\mu_\perp}{\mu_r}n(n+1) + \frac{1}{4}} - \frac{1}{2}$.

The tangential components of the electric and magnetic fields for TE modes can be written as:

$$E_\theta^{TE} = \frac{i\omega\mu_0\mu_\perp}{n_h(n_h+1)\sin\theta}\frac{\partial}{\partial\varphi}(rH_r) \quad (26)$$

$$E_\varphi^{TE} = -\frac{i\omega\mu_0\mu_\perp}{n_h(n_h+1)}\frac{\partial}{\partial\theta}(rH_r),$$

and $$H_\theta^{TE} = -\frac{1}{i\omega\mu_0\mu_\perp}\frac{1}{r}\frac{\partial}{\partial r}(rE_\varphi^{TE}) = \frac{1}{n_h(n_h+1)}\frac{1}{r}\frac{\partial^2}{\partial\theta\partial r}(r^2 H_r) \quad (27)$$

$$H_\varphi^{TE} = \frac{1}{i\omega\mu_0\mu_\perp}\frac{1}{r}\frac{\partial}{\partial r}(rE_\theta^{TE}) = \frac{1}{n_h(n_h+1)}\frac{l}{r\sin\theta}\frac{\partial^2}{\partial\varphi\partial r}(r^2 H_r).$$

For the TM modes, the tangential components are:

$$H_\theta^{TM} = -\frac{i\omega\varepsilon_0\varepsilon_\perp}{n_e(n_e+1)\sin\theta}\frac{\partial}{\partial\varphi}(rE_r) \quad (28)$$

$$H_\varphi^{TM} = \frac{i\omega\varepsilon_0\varepsilon_\perp}{n_e(n_e+1)}\frac{\partial}{\partial\theta}(rE_r),$$

and $$E_\theta^{TM} = \frac{1}{i\omega\varepsilon_0\varepsilon_\perp}\frac{1}{r}\frac{\partial}{\partial r}(rH_\varphi^{TM}) = \frac{1}{n_e(n_e+1)}\frac{1}{r}\frac{\partial^2}{\partial\theta\partial r}(r^2 E_r) \quad (29)$$

$$E_\varphi^{TM} = -\frac{1}{i\omega\varepsilon_0\varepsilon_\perp}\frac{1}{r}\frac{\partial}{\partial r}(rH_\theta^{TM}) = \frac{1}{n_e(n_e+1)}\frac{l}{r\sin\theta}\frac{\partial^2}{\partial\varphi\partial r}(r^2 E_r).$$

3 Scattering by an Anisotropic Sphere

Assuming the incident wave is a x polarized plane wave travelling in the z direction:

$$\vec{E}^i = \hat{x}E_0 e^{ik_0 z} = \hat{x}E_0 e^{ik_0 r \cos\theta}, \quad (30)$$

the incident electric and magnetic fields in the spherical coordinate can be written as [16]:

$$E_r^i = \cos\varphi\sin\theta E_x^i = \frac{E_0}{k_0^2 r^2}\cos\varphi\sum_{n=1}i^{(n+1)}(2n+1)\psi_n(k_0 r)P_n^{(1)}(\cos\theta) \quad (31)$$

$$H_r^i = \sin\varphi\sin\theta\frac{E_x^i}{\eta} = \frac{E_0}{\eta k_0^2 r^2}\sin\varphi\sum_{n=1}i^{(n+1)}(2n+1)\psi_n(k_0 r)P_n^{(1)}(\cos\theta),$$

where $E_0$ is the incident electric field amplitude and $\eta$ is the free-space impedance. Because of the interaction between the incident field and the particle, light is scattered. Since the scattered fields have to vanish in the infinity the scattered light is expressed as:

$$E_r^s = -\frac{E_0}{k_0^2 r^2}\cos\varphi \sum_{n=1} i^{(n+1)}(2n+1)a_n\xi_n(k_0 r)P_n^{(1)}(\cos\theta) \quad (32)$$

$$H_r^s = -\frac{E_0}{\eta k_0^2 r^2}\sin\varphi \sum_{n=1} i^{(n+1)}(2n+1)b_n\xi_n(k_0 r)P_n^{(1)}(\cos\theta).$$

The fields inside the sphere have to vanish at the origin. Hence they can be expressed as:

$$E_r^r = \frac{E_0}{k_0^2 r^2}\cos\varphi \sum_{n=1} i^{(n+1)}(2n+1)c_n\psi_{n_e}(k_0\sqrt{\varepsilon_\perp\mu_\perp}\,r)P_n^{(1)}(\cos\theta) \quad (33)$$

$$H_r^r = \frac{E_0}{\eta k_0^2 r^2}\sin\varphi \sum_{n=1} i^{(n+1)}(2n+1)d_n\psi_{n_h}(k_0\sqrt{\varepsilon_\perp\mu_\perp}\,r)P_n^{(1)}(\cos\theta).$$

By applying the boundary conditions at the particle interfaces:

$$E_\theta^r(k_0\sqrt{\varepsilon_\perp\mu_\perp}R) = E_\theta^i(k_0 R) + E_\theta^s(k_0 R)$$

$$H_\theta^r(k_0\sqrt{\varepsilon_\perp\mu_\perp}R) = H_\theta^i(k_0 R) + H_\theta^s(k_0 R), \quad (34)$$

we can find $a_n$ and $b_n$, which are electric and magnetic Mie scattering coefficients, respectively. The total scattering and extinction cross-sections can be expressed as [25]:

$$C_{sca} = \frac{2\pi}{k_0^2}\sum_{n=1}^{\infty}(2n+1)(|a_n|^2 + |b_n|^2), \quad (35)$$

$$C_{ext} = \frac{2\pi}{k_0^2}\sum_{n=1}^{\infty}(2n+1)Re\{a_n + b_n\}.$$

Figure 19:
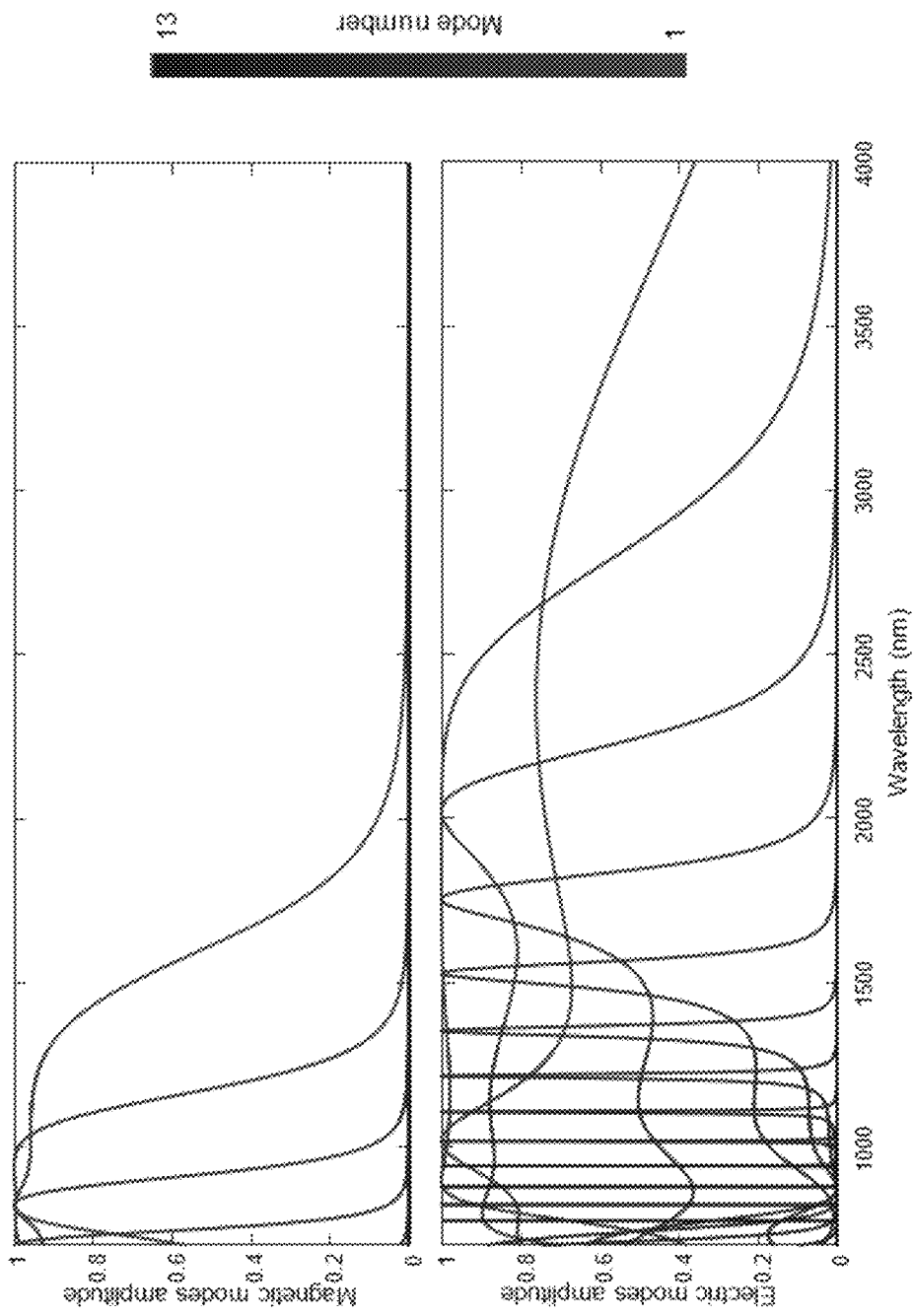
FIG. 19: Scattering amplitude for electric ($|a_n|^2$) and magnetic modes ($|b_n|^2$) for a low-index particle with anisotropic metamaterial shell. The parameters for the particle are the same as those in FIG. 15.
Figure 20:
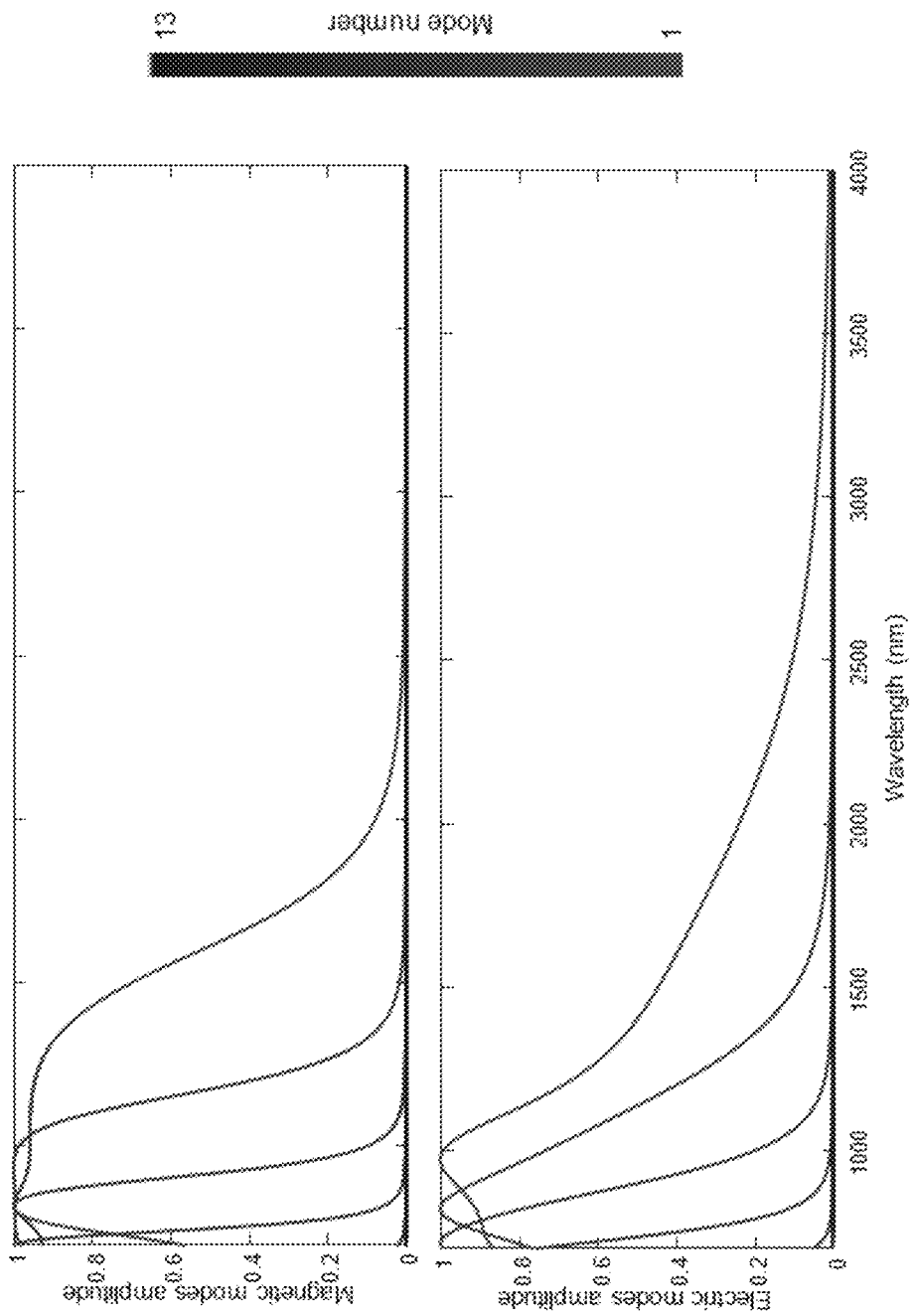
FIG. 20: Scattering amplitude for electric ($|a_n|^2$) and magnetic modes ($|b_n|^2$) for a the structure shown in FIG. 19 without the metamaterial shell.

FIGS. 19 and 20 show the scattering amplitudes for the electric and magnetic modes with and without the anisotropic metamaterial shell, respectively. The parameters are the same as those in FIG. 7. Since the magnetic modes do not feel the anisotropy, the scattering coefficients for these modes are not affected by the presence of the metamaterial shell. However, as seen in FIG. 7, the anisotropic metamaterial shell significantly enhances the response to the electric modes and as a result, the excitation of higher order modes.

In one or more examples, the particles described herein are composed of a low-index nanoparticle covered by a shell of nanowires with ability to engineer and tune their optical properties. Since the feature size of the nanowires is in sub-wavelength regime, effective medium theory can be applied to homogenize the shell. We have used Maxwell-Garnett effective medium theory [20] to model the nanowires with an all-dielectric metamaterial representing radial anisotropy. Since the filling factor reduces as the radius increases, the metamaterial shell also demonstrates a graded-index profile [1]. A comparison between the FDTD simulation [35] of the practical structure and analytical calculation of the field distribution in the homogenized structure demonstrates the success of modeling of the nanowires with radial anisotropic metamaterial (FIG. 1). However, when the refractive index of the nanowires increases, and the Mie modes in the nanowires are excited, the effective medium theory needs to be modified [56, 53].

REFERENCES

The following references are incorporated by reference herein.

[1] Joong Hwan Bahng, Saman Jahani, Douglas G Montjoy, Timothy Yao, Nicholas Kotov, and Alireza Marandi. Mie resonance engineering in meta-shell supraparticles for nanoscale nonlinear optics. ACS nano, 14(12):17203-17212, 2020 (including supplemental information).

[2] Joong Hwan Bahng, Bongjun Yeom, Yichun Wang, Siu On Tung, J Damon Hoff, and Nicholas Kotov. Anomalous dispersions of â€˜hedgehogâ€™particles. Nature, 517 (7536):596-599, 2015.

[3] Denis G Baranov, Dmitry A Zuev, Sergey I Lepeshov, Oleg V Kotov, Alexander E Krasnok, Andrey B Evlyukhin, and Boris N Chichkov. All-dielectric nanophotonics: the quest for better materials and fabrication techniques. Optica, 4(7):814-825, 2017.

[4] Craig F Bohren and Donald R Huffman. Absorption and scattering of light by small particles. John Wiley & Sons, 2008.

[5] Robert W Boyd. Nonlinear optics. Academic press, 2019.

[6] Rocio Camacho-Morales, Mohsen Rahmani, Sergey Kruk, Lei Wang, Lei Xu, Daria A Smirnova, Alexander S Solntsev, Andrey Miroshnichenko, Hark Hoe Tan, Fouad Karouta, et al. Nonlinear generation of vector beams from algaas nanoantennas. Nano Letters, 16(11):7191-7197, 2016.

[7] Peter B Catrysse and Shanhui Fan. Transverse electromagnetic modes in aperture waveguides containing a metamaterial with extreme anisotropy. Physical review letters, 106(22):223902, 2011.

[8] Zhigang Chen, Allen Taflove, and Vadim Backman. Photonic nanojet enhancement of backscattering of light by nanoparticles: a potential novel visible-light ultramicroscopy technique. Optics express, 12(7):1214-1220, 2004.

[9] Lan Jen Chu. Physical limitations of omni-directional antennas. Journal of applied physics, 19(12):1163-1175, 1948.

[10] R Collin and S Rothschild. Evaluation of antenna q. IEEE Transactions on Antennas and Propagation, 12(1): 23-27, 1964.

[11] Robert C Eckardt, C D Nabors, William J Kozlovsky, and Robert L Byer. Optical parametric oscillator frequency tuning and control. JOSA B, 8(3):646-667, 1991.

[12] G A Ermolaev, D V Grudinin, Y V Stebunov, K V Voronin, V G Kravets, Jiahua Duan, A B Mazitov, G I Tselikov, Andrei Bylinkin, D I Yakubovsky, et al. Giant optical anisotropy in transition metal dichalcogenides for next-generation photonics. Nature Communications, 12(1):854, 2021.

[13] Carlo Gigli, Tong Wu, Giuseppe Marino, Adrien Borne, Giuseppe Leo, and Philippe Lalanne. Quasinormal-mode non-hermitian modeling and design in nonlinear nanooptics. ACS Photonics, 2020.

[14] V F Gili, L Carletti, A Locatelli, D Rocco, Marco Finazzi, Lavinia Ghirardini, I Favero, C Gomez, A Lemaî3053'ftre, Michele Celebrano, et al. Monolithic algaas second-harmonic nanoantennas. Optics Express, 24(14):15965-15971, 2016.

[15] Thomas D Green, Denis G Baranov, Battulga Munkhbat, Ruggero Verre, Timur Shegai, and Mikael Kall. Optical material anisotropy in high-index transition metal dichalcogenide mie nanoresonators. Optica, 7(6):680-686, 2020.

[16] Roger F Harrington. *Time-harmonic electromagnetic fields*. McGraw-Hill, 1961.
[17] John David Jackson. *Classical electrodynamics*. John Wiley & Sons, 2007.
[18] John David Jackson. *Classical electrodynamics*. John Wiley & Sons, 2007.
[19] Zubin Jacob, Leonid V Alekseyev, and Evgenii Narimanov. Optical hyperlens: far-field imaging beyond the diffraction limit. *Optics express*, 14(18):8247-8256, 2006.
[20] Saman Jahani and Zubin Jacob. Transparent subdiffraction optics: nanoscale light confinement without metal. *Optica*, 1(2):96-100, 2014.
[21] Saman Jahani and Zubin Jacob. Breakthroughs in photonics 2014: relaxed total internal reflection. *IEEE Photonics Journal*, 7(3):1-5, 2015.
[22] Saman Jahani and Zubin Jacob. All-dielectric metamaterials. *Nature nanotechnology*, 11(1):23, 2016.
[23] Saman Jahani, Sangsik Kim, Jonathan Atkinson, Justin C Wirth, Farid Kalhor, Abdullah Al Noman, Ward D Newman, Prashant Shekhar, Kyunghun Han, Vien Van, et al. Controlling evanescent waves using silicon photonic all-dielectric metamaterials for dense integration. *Nature communications*, 9(1):1893, 2018.
[24] Saman Jahani, Arkadev Roy, and Alireza Marandi. Wavelength-scale optical parametric oscillators. *Optica*, 8(2), 2021.
[25] Milton Kerker. *The scattering of light and other electromagnetic radiation: physical chemistry: a series of monographs*, volume 16. Academic press, 2013.
[26] Kirill Koshelev, Sergey Kruk, Elizaveta Melik-Gaykazyan, Jae-Hyuck Choi, Andrey Bogdanov, Hong-Gyu Park, and Yuri Kivshar. Subwavelength dielectric resonators for nonlinear nanophotonics. *Science*, 367(6475): 288-292, 2020.
[27] Alexander Krasnok, Mykhailo Tymchenko, and Andrea Alu. Nonlinear metasurfaces: a paradigm shift in nonlinear optics. *Materials Today*, 21(1):8-21, 2018.
[28] Arseniy I Kuznetsov, Andrey E Miroshnichenko, Mark L Brongersma, Yuri S Kivshar, and Boris Luka€™yanchuk. Optically resonant dielectric nanostructures. *Science*, 354(6314):aag2472, 2016.
[29] Wei Liu, Bing Lei, and Andrey E Miroshnichenko. Q-factor and absorption enhancement for plasmonic anisotropic nanoparticles. *Optics Letters*, 41(15):3563-3566, 2016.
[30] Wei Liu, Andrey E Miroshnichenko, and Yuri S Kivshar. Q-factor enhancement in all-dielectric anisotropic nanoresonators. *Physical Review B*, 94(19):195436, 2016.
[31] Wei Liu. Ultra-directional super-scattering of homogenous spherical particles with radial anisotropy. *Optics express*, 23(11):14734-14743, 2015.
[32] Yunxin Liu, Johan Vanacken, Xianmei Chen, Junbo Han, Zhiqiang Zhong, Zhengcai Xia, Borong Chen, Huan Wu, Zhao Jin, Jun-Yi Ge, et al. Direct observation of nanoscale light confinement without metal. *Advanced Materials*, 31(7):1806341, 2019.
[33] Huanan Li, Ahmed Mekawy, and Andrea Alu. Beyond chua€™s limit with floquet impedance matching. *Physical review letters*, 123(16):164102, 2019.
[34] Boris S Luka€™yanchuk, Ramón Paniagua-Dom13053'fnguez, Igor Minin, Oleg Minin, and Zengbo Wang. Refractive index less than two: photonic nanojets yesterday, today and tomorrow. *Optical Materials Express*, 7(6):1820-1847, 2017.
[35] Lumerical. http://www.lumerical.com, FDTD Solutions.
[36] Alireza Marandi, Zhe Wang, Kenta Takata, Robert L Byer, and Yoshihisa Yamamoto. Network of time-multiplexed optical parametric oscillators as a coherent ising machine. *Nature Photonics*, 8(12):937, 2014.
[37] Giuseppe Marino, Alexander S Solntsev, Lei Xu, Valerio F Gili, Luca Carletti, Alexander N Poddubny, Mohsen Rahmani, Dana A Smirnova, Haitao Chen, Aristide Lema13053'ftre, et al. Spontaneous photon-pair generation from a dielectric nanoantenna. *Optica*, 6(11): 1416-1422, 2019.
[38] Peter L McMahon, Alireza Marandi, Yoshitaka Haribara, Ryan Hamerly, Carsten Langrock, Shuhei Tamate, Takahiro Inagaki, Hiroki Takesue, Shoko Utsunomiya, Kazuyuki Aihara, et al. A fully programmable 100-spin coherent ising machine with all-to-all connections. *Science*, 354(6312):614-617, 2016.
[39] Olivier Morin, Kun Huang, Jianli Liu, Hanna Le Jeannic, Claude Fabre, and Julien Laurat. Remote creation of hybrid entanglement between particle-like and wave-like optical qubits. *Nature Photonics*, 8(7):570, 2014.
[40] A V Muraviev, V O Smolski, Z E Loparo, and K L Vodopyanov. Massively parallel sensing of trace molecules and their isotopologues with broadband subharmonic mid-infrared frequency combs. *Nature Photonics*, 12(4):209-214, 2018.
[41] Rajveer Nehra, Aye Win, Miller Eaton, Reihaneh Shahrokhshahi, Niranjan Sridhar, Thomas Gerrits, Adriana Lita, Sae Woo Nam, and Olivier Pfister. State-independent quantum state tomography by photon-number-resolving measurements. *Optica*, 6(10):1356-1360, 2019.
[42] Michael P Nielsen, Xingyuan Shi, Paul Dichtl, Stefan A Maier, and Rupert F Oulton. Giant nonlinear response at a plasmonic nanofocus drives efficient four-wave mixing. *Science*, 358(6367):1179-1181, 2017.
[43] Shanyuan Niu, Graham Joe, Huan Zhao, Yucheng Zhou, Thomas Orvis, Huaixun Huyan, Jad Salman, Krishnamurthy Mahalingam, Brittany Urwin, Jiangbin Wu, et al. Giant optical anisotropy in a quasi-one-dimensional crystal. *Nature Photonics*, 12(7):392-396, 2018.
[44] Benjamin A Palmer, Venkata Jayasurya Yallapragada, Nathan Schiffmann, Eyal Merary Wormser, Nadav Elad, Eliahu D Aflalo, Amir Sagi, Steve Weiner, Lia Addadi, and Dan Oron. A highly reflective biogenic photonic material from core-shell birefringent nanoparticles. *Nature nanotechnology*, 15(2):138-144, 2020.
[45] Thomas Pertsch and Yuri Kivshar. Nonlinear optics with resonant metasurfaces. *MRS Bulletin*, 45(3):210-220, 2020.
[46] Ye Pu, Rachel Grange, Chia-Lung Hsieh, and Demetri Psaltis. Nonlinear optical properties of core-shell nanocavities for enhanced second-harmonic generation. *Physical review letters*, 104(20):207402, 2010.
[47] Cheng-Wei Qiu, Li Hu, Xiaofei Xu, and Yijun Feng. Spherical cloaking with homogeneous isotropic multilayered structures. *Physical Review E*, 79(4):047602, 2009.
[48] Cheng-Wei Qiu and Boris Luk'yanchuk. Peculiarities in light scattering by spherical particles with radial anisotropy. *JOSA A*, 25(7):1623-1628, 2008.
[49] C-W Qiu, L-W Li, Q Wu, and T-S Yeo. Field representations in general gyrotropic media in spherical coordinates. *IEEE Antennas and Wireless Propagation Letters*, 4:467-470, 2005.
[50] Orad Reshef, Israel De Leon, M Zahirul Alam, and Robert W Boyd. Nonlinear optical effects in epsilon-near-zero media. *Nature Reviews Materials*, 4(8):535-551, 2019.

[51] Conor T Riley, Joseph S T Smalley, Kirk W Post, Dimitri N Basov, Yeshaiahu Fainman, Deli Wang, Zhaowei Liu, and Donald J Sirbuly. High-quality, ultraconformal aluminum-doped zinc oxide nanoplasmonic and hyperbolic metamaterials. *Small*, 12(7):892-901, 2016.

[52] Arkadev Roy, Saman Jahani, Carsten Langrock, Martin Fejer, and Alireza Marandi. Spectral phase transitions in optical parametric oscillators. *Nature communications*, 12(1):835, 2021.

[53] Mikhail V Rybin, Dmitry S Filonov, Kirill B Samusev, Pavel A Belov, Yuri S Kivshar, and Mikhail F Limonov. Phase diagram for the transition from photonic crystals to dielectric metamaterials. *Nature communications*, 6(1):1-6, 2015.

[54] Gregoire Saerens, Iek Tang, Mihail I Petrov, Kristina Frizyuk, Claude Renaut, Flavia Timpu, Marc Reig Escale, Igor Shtrom, Alexey Bouravleuv, George Cirlin, Rachel Grange, and Maria Timofeeva. Engineering of the second-harmonic emission directionality with iii-v semiconductor rod nanoantennas. *Laser & Photonics Reviews*, page 2000028, 2020.

[55] Jon A Schuller and Mark L Brongersma. General properties of dielectric optical antennas. *Optics express*, 17(26):24084-24095, 2009.

[56] Jon A Schuller, Rashid Zia, Thomas Taubner, and Mark L Brongersma. Dielectric metamaterials based on electric and magnetic resonances of silicon carbide particles. *Physical review letters*, 99(10):107401, 2007.

[57] Maxim R Shcherbakov, Dragomir N Neshev, Ben Hopkins, Alexander S Shorokhov, Isabelle Staude, Elizaveta V Melik-Gaykazyan, Manuel Decker, Alexander A Ezhov, Andrey E Miroshnichenko, Igal Brener, et al. Enhanced third-harmonic generation in silicon nanoparticles driven by magnetic response. *Nano letters*, 14(11): 6488-6492, 2014.

[58] Daniel F Sievenpiper, David C Dawson, Minu M Jacob, Tumay Kanar, Sanghoon Kim, Jiang Long, and Ryan G Quarfoth. Experimental validation of performance limits and design guidelines for small antennas. *IEEE Transactions on Antennas and Propagation*, 60(1):8-19, 2011.

[59] Daria Smirnova and Yuri S Kivshar. Multipolar nonlinear nanophotonics. *Optica*, 3(11):1241-1255, 2016.

[60] Kerry J Vahala. Optical microcavities. *Nature*, 424 (6950):839-846, 2003.

[61] Kai Wang, James G Titchener, Sergey S Kruk, Lei Xu, Hung-Pin Chung, Matthew Parry, Ivan I Kravchenko, Yen-Hung Chen, Alexander S Solntsev, Yuri S Kivshar, et al. Quantum metasurface for multiphoton interference and state reconstruction. *Science*, 361(6407):1104-1108, 2018.

[62] Harold A Wheeler. Fundamental limitations of small antennas. *Proceedings of the IRE*, 35(12):1479-1484, 1947.

[63] Ling-An Wu, H J Kimble, J L Hall, and Huifa Wu. Generation of squeezed states by parametric down conversion. *Physical review letters*, 57(20):2520, 1986.

[64] Fang Xu, Rong-Chung Tyan, Pang-Chen Sun, Yeshayahu Fainman, Chuan-Cheng Cheng, and Axel Scherer. Fabrication, modeling, and characterization of form-birefringent nanostructures. *Optics letters*, 20(24): 2457-2459, 1995.

[65] Yuanmu Yang, Wenyi Wang, Abdelaziz Boulesbaa, Ivan I Kravchenko, Dayrl P Briggs, Alexander Puretzky, David Geohegan, and Jason Valentine. Nonlinear fano-resonant dielectric metasurfaces. *Nano letters*, 15(11):7388-7393, 2015.

[66] Filiz Yesilkoy, Eduardo R Arvelo, Yasaman Jahani, Mingkai Liu, Andreas Tittl, Volkan Cevher, Yuri Kivshar, and Hatice Altug. Ultrasensitive hyperspectral imaging and biodetection enabled by dielectric metasurfaces. *Nature Photonics*, 13(6):390-396, 2019.

[67] Yu Zhang, Nathaniel K Grady, Ciceron Ayala-Orozco, and Naomi J Halas. Three-dimensional nanostructures as highly efficient generators of second harmonic light. *Nano letters*, 11(12):5519-5523, 2011.

[68] Richard W Ziolkowski and Allison D Kipple. Application of double negative materials to increase the power radiated by electrically small antennas. *IEEE Transactions on Antennas and Propagation*, 51(10):2626-2640, 2003.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A composition of matter useful for interacting with electromagnetic radiation, comprising:
   one or more particles, wherein each of the one or more particles comprises a core and a metamaterial shell around the core, and wherein:
   the metamaterial shell comprises structures having at least one dimension smaller than a wavelength of the electromagnetic radiation interacting with the one or more particles,
   the structures each have a length and a width,
   the length is along a direction extending from a surface of the core, and
   the length is longer than the width so that an interaction of the electromagnetic radiation with the structures is anisotropic across the shell.

2. The composition of matter of claim 1, wherein the metamaterial shell comprises one or more conformal layers conformal with the surface of the core.

3. The composition of matter of claim 1, comprising separations between the structures, wherein the separations vary with increasing distance in a radial direction away from the core so that the electromagnetic interaction with the shell is different as a function of the distance from the core.

4. The composition of matter of claim 1, wherein the metamaterial shell comprises at least one material selected from a metal, a dielectric, semiconductor, doped material, a polymer, or a two dimensional material.

5. The composition of matter of claim 1, wherein the structures are chemically synthesized from the surface of the core using a bottom up approach.

6. The composition of matter of claim 1, wherein:
   the structures are dimensioned to have the interaction comprising a near field interaction with the electromagnetic radiation, and
   each of the particles are dimensioned so that the electromagnetic radiation is coupled to the metamaterial shell from a far field of the electromagnetic radiation.

7. The composition of matter of claim 1, wherein the structures are dimensioned to have a near field interaction with the electromagnetic radiation after the electromagnetic radiation is coupled to the metamaterial shell through a near field interaction with another device.

8. A resonator comprising the composition of matter of claim 1, wherein the structures are tailored to achieve predetermined electromagnetic resonance frequencies of the electromagnetic radiation interacting with the one or more particles.

9. An anti-reflection coating comprising the resonator of claim 8, wherein the structures tailor the predetermined electromagnetic resonance frequencies and an electromagnetic field profile of the electromagnetic radiation so as to suppress reflection of the electromagnetic radiation from the anti-reflection coating in one or more directions.

10. A wavelength converter comprising the resonator of claim 8, wherein the structures comprise a material having a nonlinear susceptibility generating an output electromagnetic field in response to the electromagnetic radiation incident on the material, wherein the output electromagnetic field has one or more output wavelengths longer or shorter than one or more input wavelengths of the electromagnetic radiation.

11. The wavelength converter of claim 10, wherein the wavelength converter comprises an optical parametric oscillator and the output electromagnetic field has the output wavelengths longer than pump wavelengths.

12. A modulator or switch comprising the resonator of claim 8, wherein the structures tailor the predetermined electromagnetic resonance frequencies and an electromagnetic field profile of the electromagnetic radiation so as to modulate or switch on and off at least one of a scattering, a transmission, an amplitude, or frequency of the electromagnetic radiation according to a signal.

13. A thermophotovoltaic device comprising the resonator of claim 8, wherein the structures tailor the predetermined electromagnetic resonance frequencies and an electromagnetic field profile of the electromagnetic radiation so as to control blackbody emission from the thermophotovoltaic device.

14. The composition of matter of claim 1, wherein the metamaterial shell comprises a graded-index profile in a effective refractive index in a radial direction.

15. The composition of matter of claim 1, wherein the metamaterial shell comprises an effective anisotropy in an refractive index having an optical axis in radial direction.

16. A method of making a composition of matter useful for interacting with electromagnetic radiation, comprising:
   forming a metamaterial shell around a core to fabricate one or more particles, wherein the metamaterial shell comprises structures having at least one dimension smaller than a wavelength of the electromagnetic radiation interacting with the one or more particles, wherein,
   the forming comprises bottom up fabrication including deposition in three dimensions from a surface of the core,
   the structures have a length and a width,
   the length is along a direction extending from the surface of the core, and
   the length is longer than the width so that an interaction of the electromagnetic radiation with the structures is anisotropic across the shell.

17. The method of claim 16, wherein the forming comprises at least one of chemical synthesis on the core or etching a material deposited on the core.

18. The method of claim 16, wherein the structures are engineered so that the interaction with the electromagnetic radiation with the structures controls at least one of a reflection, transmission, absorption, scattering, wavelength conversion, electromagnetic-matter interaction, or all optical switching of the electromagnetic radiation.

\* \* \* \* \*